United States Patent
Wang et al.

(10) Patent No.: US 12,517,198 B2
(45) Date of Patent: Jan. 6, 2026

(54) PULSED VECTOR MAGNETOMETER USING A FAST ROTATING FIELD

(71) Applicants: The Trustees of Princeton University, Princeton, NJ (US); Twinleaf LLC, Plainsboro, NJ (US)

(72) Inventors: Tao Wang, Princeton, NJ (US); Wonjae Lee, Princeton, NJ (US); Michael Romalis, Princeton, NJ (US); Mark Limes, Princeton, NJ (US); Thomas Kornack, Plainsboro, NJ (US); Elizabeth Foley, Plainsboro, NJ (US)

(73) Assignee: Trustees of Princeton University, Princeton, NJ (US)

( * ) Notice: Subject to any disclaimer, the term of this patent is extended or adjusted under 35 U.S.C. 154(b) by 747 days.

(21) Appl. No.: 17/958,907

(22) Filed: Oct. 3, 2022

(65) Prior Publication Data

US 2025/0314721 A1    Oct. 9, 2025

Related U.S. Application Data

(60) Provisional application No. 63/251,388, filed on Oct. 1, 2021.

(51) Int. Cl.
  *G01R 33/26*    (2006.01)
(52) U.S. Cl.
  CPC .................................. *G01R 33/26* (2013.01)
(58) Field of Classification Search
  CPC ......................................................... G01R 33/26
  USPC ...................................................... 324/244.1
  See application file for complete search history.

(56) References Cited

U.S. PATENT DOCUMENTS

| 3,289,001 A | * | 11/1966 | Wilcox | H04B 10/505 |
| | | | | 250/214 SW |
| 5,752,513 A | * | 5/1998 | Acker | G01B 7/004 |
| | | | | 324/207.13 |
| 7,872,473 B2 | * | 1/2011 | Kitching | G01R 33/26 |
| | | | | 324/319 |
| 2004/0140799 A1 | * | 7/2004 | Romalis | G01R 33/02 |
| | | | | 324/304 |

(Continued)

OTHER PUBLICATIONS

Ingleby, Stuart J., et al. "Resonant very low-and ultra low frequency digital signal reception using a portable atomic magnetometer." arXiv preprint arXiv:2003.03267 (2020). (Year: 2020).*

(Continued)

*Primary Examiner* — Christopher P Mcandrew
(74) *Attorney, Agent, or Firm* — Meagher Emanuel Laks Goldberg & Liao, LLP

(57) ABSTRACT

Atomic magnetometers are usually used as scalar sensors to measure the magnitude of the magnetic field. The magnetic field is converted to a frequency that can be measured with high fractional precision. There are no comparable methods for measuring vector magnetic field components. Common sensors, such as flux-gate and SQUID magnetometers, suffer from calibration and orthogonality uncertainty. Disclosed is a method of using an atomic magnetometer to measure the magnitude and two polar angles of the magnetic field vector. The two polar angles are dimensionless quantities and can be measured with high fractional precision. Also disclosed is a particular measurement procedure that is immune to systematic effects in such measurements.

19 Claims, 12 Drawing Sheets

(56) References Cited

U.S. PATENT DOCUMENTS

2014/0159718 A1* 6/2014 Larsen .................. G01R 33/26
324/301
2018/0321333 A1* 11/2018 Cochrane ........... G01R 33/0035

OTHER PUBLICATIONS

Vershovskii, A.K. et al., "Fast Three-Component Magnetometer-Variometer Based on a Cesium Sensor", Technical Physics, vol. 51, No. 1, pp. 112-117, Jan. 2006.
Degen, C.L. et al., "Quantum sensing", Reviews of Modern Physics, vol. 89, p. 035002, 2017.
Dang, H.B. et al., "Ultrahigh sensitivity magnetic field and magnetization measurements with an atomic magnetometer", Applied Physics Letters, vol. 97, p. 151110, 2010.
Sheng, D. et al., "Subfemtotesla Scalar Atomic Magnetometry Using Multipass Cells", Physical Review Letters, vol. 110, p. 160802, Apr. 19, 2013.
Boto, Elena et al., "Moving magnetoencephalography towards real-world applications with a wearable system", Nature, vol. 555, p. 657, Mar. 29, 2018.
Limes, M.E. et al., "Portable Magnetometry for Detection of Biomagnetism in Ambient Environments", Physical Review Applied, vol. 14, p. 011002, 2020.
Shah, Vishal K. and Wakai, Ronald T., "A compact, high performance atomic magnetometer for biomedical applications", Physics in Medicine and Biology, vol. 58, pp. 8153-8161, 2013.
Borna, Amir et al., "Non-Invasive Functional-Brain-Imaging with an OPM-based Magnetoencephalography System", PLoS One, 24 pages, Jan. 24, 2020.
Savukov, I. and Karaulanov, T., "Magnetic-resonance imaging of the human brain with an atomic magnetometer", Applied Physics Letters, vol. 103, p. 043703, 2013.
De Lange, Paul et al., "Measuring the cortical tracking of speech with optically-pumped magnetometers", NeuroImage, vol. 233, p. 117696, 2021.
Afach, Samer et al., "Search for topological defect dark matter with a global network of optical magnetometers", arXiv:2102.13379, 2021.
Safronova, M.S. et al., "Search for new physics with atoms and molecules", Reviews of Modern Physics, vol. 90, No. 2, p. 025008, 2018.
Budker, Dmitry et al., "Proposal for a Cosmic Axion Spin Precession Experiment (CASPEr)", Physical Review X, vol. 4, p. 021030, 2014.
Garcon, Antoine et al., "Constraints on bosonic dark matter from ultralow-field nuclear magnetic resonance", Science Advances, vol. 5, No. eaax4539, 9 pages, Oct. 25, 2019.
Wang, Tao et al., "Application of spin-exchange relaxation-free magnetometry to the Cosmic Axion Spin Precession Experiment", Physics of the Dark Universe, vol. 19, pp. 27-35, 2018.
Sheinker, Arie et al., "Magnetic Anomaly Detection Using a Three-Axis Magnetometer", IEEE Transactions on Magnetics, vol. 45, No. 1, Jan. 2009.
Zhou, Jiaxin et al., "Spatial Signature Analysis of Submarine Magnetic Anomaly at Low Altitude", IEEE Transactions on Magnetics, vol. 53, No. 12, Dec. 2017.
Slocum, Robert E. and Reilly, Francis N., "Low Field Helium Magnetometer for Space Applications", IEEE Transactions on Nuclear Science, vol. 10, pp. 165-171, 1963.
Brown, J.M. et al., "New Limit on Lorentz- and CPT-Violating Neutron Spin Interactions", Physical Review Letters, vol. 105, p. 151604, Oct. 8, 2010.
Groeger, S. et al., "Laser-pumped cesium magnetometers for high-resolution medical and fundamental research", Sensors and Actuators A: Physical, vol. 129, pp. 1-5, 2006.
Bison, G. et al., "A room temperature 19-channel magnetic field mapping device for cardiac signals", Applied Physics Letters, vol. 95, p. 173701, 2009.
Zhang, Rui et al., "Recording brain activities in unshielded Earth's field with optically pumped atomic magnetometers", Science Advances, vol. 6, No. eaba8792, 8 pages, Jun. 12, 2020.
Thomson, S. et al., "Airborne Geophysics—Evolution and Revolution", Proceedings of Exploration 07: Fifth Decennial International Conference on Mineral Exploration, pp. 19-37, 2007.
Bao, Guzhi et al., "Suppression of the Nonlinear Zeeman Effect and Heading Error in Earth-Field-Range Alkali-Vapor Magnetometers", Physical Review Letters, vol. 120, p. 033202, Jan. 17, 2018.
Wang, He et al., "Aeromagnetic Compensation With Suppressing Heading Error of the Scalar Atomic Magnetometer", IEEE Geoscience and Remote Sensing Letters, 5 pages, 2019.
Lee, W. et al., "Heading errors in all-optical alkali-metal-vapor magnetometers in geomagnetic fields", Physical Review A, vol. 103, p. 063103, Jun. 4, 2021.
Wiegert, Roy et al., "Demonstration of a Novel Man-Portable Magnetic STAR Technology for Real Time Localization of Unexploded Ordnance", IEEE Oceans, pp. 1-7, 2007.
Brookes, Matthew J. et al., "Theoretical advantages of a triaxial optically pumped magnetometer magnetoencephalography system", NeuroImage, vol. 236, p. 118025, 2021.
Alexsandrov, E.B. et al., "Three-component variometer based on a scalar potassium sensor", Measurement Science and Technology, vol. 15, pp. 918-922, Apr. 6, 2004.
Vershovskii, A.K. et al., "Fast Three-Component Magnetometer-Variometer Based on a Cesium Sensor", Technical Physics, vol. 51, No. 1, pp. 112-117, 2006.
Seltzer, S.J. and Romalis, M.V., "Unshielded three-axis vector operation of a spin-exchange-relaxation-free atomic magnetometer", Applied Physics Letters, vol. 85, No. 20, p. 4804-4806, Nov. 15, 2004.
Li, Zhimin et al., "Parametric modulation of an atomic magnetometer", Applied Physics Letters, vol. 89, p. 134105, Sep. 27, 2006.
Fairweather, A.J. and Usher, M.J., "A vector rubidium magnetometer", Journal of Physics E: Scientific Instruments, vol. 5, pp. 986-990, 1972.
Afach, S. et al., "Highly stable atomic vector magnetometer based on free spin precession", Optics Express, vol. 23, No. 17, Aug. 24, 2015.
Bison, G. et al., "Sensitive and stable vector magnetometer for operation in zero and finite fields", Optics Express, vol. 26, No. 13, Jun. 25, 2018.
Huang, H.C. et al., "Three-axis atomic magnetometer based on spin precession modulation", Applied Physics Letters, vol. 107, p. 182403, Nov. 2, 2015.
Pustelny, S. and Gawlik, W., "Nonlinear magneto-optical rotation with modulated light in tilted magnetic fields", Physical Review A, vol. 74, p. 063420, Dec. 29, 2006.
Auzinsh, M. et al., "Light-induced polarization effects in atoms with partially resolved hyperfine structure and applications to absorption, fluorescence, and nonlinear magneto-optical rotation", Physical Review A, vol. 80, p. 053406, Nov. 9, 2009.
Pyragius, Tadas et al., "Voigt-effect-based three-dimensional vector magnetometer", Physical Review A, vol. 100, p. 023416, Aug. 21, 2019.
Cox, Kevin et al., "Measurements of the magnetic field vector using multiple electromagnetically induced transparency resonances in Rb vapor", Physical Review A, vol. 83, p. 015801, Jan. 14, 2011.
Patton, B. et al., "All-Optical Vector Atomic Magnetometer", Physical Review Letters, vol. 113, p. 013001, Jul. 4, 2014.
Kiehl, Christopher et al., "Absolute vector magnetometry with atomic vapor by referencing to microwave polarization", 51st Annual Meeting of the APS Division of Atomic, Molecular and Optical Physics, vol. 65, No. 4, Jun. 2020.
Aleksandrov, E.B. and Vershovskii, A.K., "Modern radio-optical methods in quantum magnetometry", Physics Uspekhi, vol. 52, No. 6, pp. 573-601, 2009.
Lucivero, V.G. et al., "Femtotesla Direct Magnetic Gradiometer Using a Single Multipass Cell", Physical Review Applied, vol. 15, p. 014004, Jan. 6, 2021.
Schwindt, Peter D. D. et al., "Chip-scale atomic magnetometer", Applied Physics Letters, vol. 85, No. 26, pp. 6409-6411, Dec. 27, 2004.

(56) References Cited

OTHER PUBLICATIONS

Liew, Li-Anne et al., "Microfabricated alkali atom vapor cells", Applied Physics Letters, vol. 84, No. 14, pp. 2694-2696, Apr. 5, 2004.

Shah, Vishal et al., "Subpicotesla atomic magnetometry with a microfabricated vapour cell", Nature Photonics, vol. 1, pp. 649-652, Nov. 1, 2007.

Gerginov, Vladislav et al., "Scalar Magnetometry Below 100 fT/Hz1=2 in a Microfabricated Cell", IEEE Sensors Journal. vol. 20, p. 12684, 2020.

Wilson, Nathanial et al., "Wide-bandwidth atomic magnetometry via instantaneous-phase retrieval", Physical Review Research, vol. 2, p. 013213, Feb. 26, 2020.

Anderson, Brian J. et al., "The Magnetometer Instrument on Messenger", Space Science Reviews, vol. 131, pp. 417-450, Oct. 30, 2007.

Afach, S. et al., "Characterization of the global network of optical magnetometers to search for exotic physics (GNOME)", Physics of the Dark Universe, vol. 22, pp. 162-180, 2018.

Oelsner, G. et al., "Sources of heading errors in optically pumped magnetometers operated in the Earth's magnetic field", Physical Review A, vol. 99, p. 013420, Jan. 16, 2019.

Bloch, F., "Nuclear Induction", Physical Review, vol. 70, Nos. 7 and 8, Oct. 1946.

Suter, Dieter et al., "Berry's phase in magnetic resonance", Molecular Physics, vol. 61, No. 6, pp. 1327-1340, 1987.

Bize, S. et al., "High-accuracy measurement of the 87Rb ground-state hyper ne splitting in an atomic fountain", Europhysics Letters, vol. 45, No. 5, pp. 558-564, Mar. 1, 1999.

Walker, Thad G. and Happer, William, "Spin-exchange optical pumping of noble-gas nuclei", Reviews of Modern Physics, vol. 69, No. 2, pp. 629-642, Apr. 1997.

Fang, Jiancheng et al., "In situ magnetic compensation for potassium spin-exchange relaxation-free magnetometer considering probe beam pumping effect", Review of Scientific Instruments, vol. 85, p. 063108, Jun. 9, 2014.

Auzinsch, M. et al., "Chapter 4: Atoms in external electric and magnetic fields", from Optically Polarized Atoms: Understanding Light-Atom Interactions, Oxford University Press, 2010.

Savukov, I.M. et al., "Tunable Atomic Magnetometer for Detection of Radio-Frequency Magnetic Fields", Physical Review Letters, vol. 95, p. 063004, Aug. 5, 2005.

Seltzer, S.J., "2.8. Fundamental Magnetometer Sensitivity", from Developments in Alkali-Metal Atomic Magnetometry, pp. 59-62, Princeton University, 2008.

Kay, S.M., "Chapter 3. Cramer-Rao Lower Bound", from Fundamentals of Statistical Signal Processing, pp. 33-51, Prentice Hall PTR, 1993.

Kimball, Derek F. Jackson et al., "Overview of the Cosmic Axion Spin Precession Experiment (CASPEr)", from Microwave Cavities and Detectors for Axion Research, pp. 105-121, Springer, 2020.

Shapiro, I.R. et al., "The Vector Field Proton Magnetometer for IGY Satellite Ground Stations", Journal of Geophysical Research, vol. 65, No. 3, pp. 913-920, Mar. 1960.

Alldredge, L.R., "A Proposed Automatic Standard Magnetic Observatory", Journal of Geophysical Research, vol. 65, No. 11, pp. 3777-3786, Nov. 1960.

\* cited by examiner

PULSED VECTOR MAGNETOMETER USING A FAST ROTATING FIELD

CROSS-REFERENCE TO RELATED APPLICATIONS

The present application claims priority to U.S. Provisional Pat. App. No. 63/251,388, filed Oct. 1, 2021, the entirety of which is incorporated by reference herein.

STATEMENT REGARDING FEDERALLY SPONSORED RESEARCH OR DEVELOPMENT

This invention was made with government support under Grant No. N68335-21-C-0104 awarded by the Department of the Navy and Grant No. HR0011-20-C-0099 awarded by the Defense Advanced Research Projects Agency (DARPA). The government has certain rights in the invention.

TECHNICAL FIELD

The present disclosure is drawn to magnetometry, and specifically to pulsed vector magnetometry using a fast-rotating field.

BACKGROUND

Atomic magnetometers have been proven to be the most sensitive magnetic sensors available to date, which have been promisingly applied in various applications, such as biomedical imaging, dark matter detection, magnetic anomaly detection, space exploration, and fundamental physics. The atomic magnetometers directly measure the Larmor precession frequency of atomic spins. They are intrinsically sensitive to the magnitude of the magnetic field rather than magnetic field projections in three axes. The high sensitivity atomic magnetometers that can directly work in the geomagnetic fields are of great interest of many applications.

For instance, biomedical imaging based on atomic magnetometers that does not require the bulk and expensive magnetic shielded room. Their abilities of directly working in the earth field and heading error-free are essential for the airborne-exploration applications. However, optical magnetometry in the geophysical magnetic field is very challenging due to the effects that are negligible at the low magnetic field become significant in the earth field, such as the nonlinear Zeeman effect, which leads to heading error. The so-called heading error is an effect that fictitious dependence of the atomic magnetometer readings on the relative orientation of the spin polarization and magnetic field. For a vector atomic magnetometer, the measured transverse magnetic fields can provide the information about the angle tilted from the leading field, therefore, the heading error correction can be calculated based on the model of heading error.

Three vector components of the magnetic field can provide complete determination of the magnetic field and are required for many applications, like real-time localization of buried mines and unexploded ordnance. Furthermore, a vector magnetometer can help to distinguish the brain signals from the magnetic field of the environment and eliminate artefact caused by head movement.

There are several approaches to realize vector atomic magnetometers. The first is sequential scanning of the magnetic field, the polar angles are measured by comparing of the scalar readouts of the proton precession magnetometer with altered polarity and directions of a constant field in the transverse directions. The second is applying a rotating magnetic field, the three-component variometer was developed by adding a perpendicular rotating magnetic field to a scalar optically pumped potassium magnetometer. A small transverse magnetic field change can lead to oscillating components at the same frequency of the rotating field. The third is adding magnetic field modulation, e.g. cross-modulation, which extracts three-axis magnetic fields by demodulating the magnetic field cross-modulation assisted by the active three-axis magnetic field compensation to keep the alkali atoms in spin-exchange relaxation-free (SERF) regime. And parametric modulation, by applying a magnetic field modulation along the pump beam direction, a SERF magnetometer can measure the magnetic fields in two transverse directions simultaneously by demodulate the signal at the first and second harmonics of the modulation frequency. The fourth is multi-spin projections measurement, for example, applying multiple laser beams to extract vector information based on the measurement of spin projections along different laser beams. The fifth is based on the spin alignment, nonlinear magneto-optical rotation (NMOR) magnetometers with modulated light acquire the direction information of the magnetic field based on atomic alignment, the components at first and second harmonics of Larmor frequency of the optical anisotropy can be used for determining the tilt angle of the magnetic field from the light propagation direction, however, the power of pump beam needs to be kept low to avoid the alignment to orientation conversion. The sixth is the vector magnetometry based on magneto-optical phenomenons, such as the vector atomic magnetometers based on the Voigt effect and multiple electromagnetically induced transparency (EIT) resonances. Specially, all-optical vector magnetometers can be achieved by using the modulation of the light shift which acts as a pseudo-magnetic field modulation. There is the other possible approaching to accurate vector magnetometry that uses a microwave polarization ellipse as an absolute 3D reference.

Among them, the sequential modulation and the three-component variometer can provide high absolute accuracy. However, in order to maintain its quasi-static condition that the frequency of the rotating magnetic field has to be kept smaller than the spin relaxation rate to avoid the mixing Zeeman components. Which consequently limited its performance. Moreover, they are affected by the heading error caused by the rotating field: For a very slow modulation that the rotating field frequency is far smaller than the spin relaxation rate ($\omega_m \ll 1/T_2$). The slow rotating field modulation like the sequential modulation can lead to a heading error effect that is equivalent to a residual magnetic field in the transverse directions.

BRIEF SUMMARY

To provide vector measurements of 3 field components, while avoiding the problems of the above-described systems, a new technique is needed.

In some embodiments, a pulsed vector atomic magnetometer is provided. The magnetometer may include an alkali cell, a pump laser source configured to generate a pulsed pump laser to interact with the alkali cell, a probe laser source configured to generate a probe laser to interact with the alkali cell, a balanced polarimeter configured to detect the probe laser after passing through the alkali cell, three electromagnetic coils, and at least one processor. The at least one processor may be configured to: (1) control current applied to the three magnetic coils to generate a rotating magnetic field which can rotate freely in three dimensions and interacts with the alkali cell; and (2) modulate the rotating magnetic field and utilizing the probe laser to simultaneously measure a magnitude and two polar angles of a total magnetic field vector, wherein the frequency of the rotating magnetic field is greater than or equal to the transverse spin relaxation time.

In some embodiments, the at least one processor may be further configured to calculate phase shifts of the detected probe laser relative to a reference signal at the Larmor frequency. In some embodiments, the at least one processor may be further configured to calculate phase shifts between zero crossings of a precession signal and reference signal. In some embodiments, the rotating magnetic field may have a predetermined amplitude in a transverse plane relative to the ambient magnetic field. In some embodiments, modulating the magnetic field may include periodically changing the sense of rotation of the applied rotating magnetic field. In some embodiments, modulating the magnetic field may include periodically changing the sign of the applied rotating field with a predetermined pattern. In some embodiments, modulating the magnetic field may include changing the plane of rotation for the applied rotating field. In some embodiments, modulating the magnetic field may include utilizing a four-shot sequence to change the sense of rotation, sign, and/or plane of rotation of the applied rotating field. In some embodiments, the frequency of the rotating magnetic field is greater than or equal to $\pi$ times the transverse spin relaxation time.

In some embodiments, a method for measuring three vector components of a magnetic field using an atomic magnetometer is provided. The method may include controlling current applied to three magnetic coils around an alkali cell to generate a rotating magnetic field which can rotate freely in three dimensions and interacts with the alkali cell. The method may include modulating the magnetic field and utilizing a probe laser directed through the alkali cell to simultaneously measure a magnitude and two polar angles of a total magnetic field vector, wherein the frequency of the rotating magnetic field is greater than or equal to the transverse spin relaxation time.

In some embodiments, the method may include detecting the probe laser after passing through the alkali cell with a balanced polarimeter. In some embodiments, the method may include calculating phase shifts of the detected probe laser relative to a reference signal at the Larmor frequency. In some embodiments, the method may include calculating phase shifts between zero crossings of a precession signal and reference signal. In some embodiments, the rotating magnetic field may have a predetermined amplitude in a transverse plane relative to the ambient magnetic field. In some embodiments, modulating the magnetic field may include periodically changing the sense of rotation of the applied rotating magnetic field. In some embodiments, modulating the magnetic field may include periodically changing the sign of the applied rotating field with a predetermined pattern. In some embodiments, modulating the magnetic field may include changing the plane of rotation for the applied rotating field. In some embodiments, modulating the magnetic field may include utilizing a four-shot sequence to change the sensor of rotation, sign, and/or plane of rotation of the applied rotating field. In some embodiments, the frequency of the rotating magnetic field is greater than or equal to $\pi$ times the transverse spin relaxation time.

BRIEF DESCRIPTION OF DRAWINGS

FIG. 3 shows the various angles discussed below while FIG. 4 shows the paths of the pump and probe beams. The x, y and z axes are defined by the three coils inside the magnetic shield. The sensor head is mounted on a rotation stage, the cell is put on the rotation center of the stage. The sensor head can freely rotate in the x-z plane, and the angle between the symmetric centerline of the sensor head and the z-axis is defined as $\alpha$. In order to investigate the heading error caused by probe beam, the sensor head is rotated 90° as shown in the figure, then the atoms are pumped along x direction, are probed along y direction. The angle between the centerline of the sensor head and z-axis is defined as $\beta$. $\theta$ is the angle between the total field and the z-axis.

DETAILED DESCRIPTION

Figure 1:
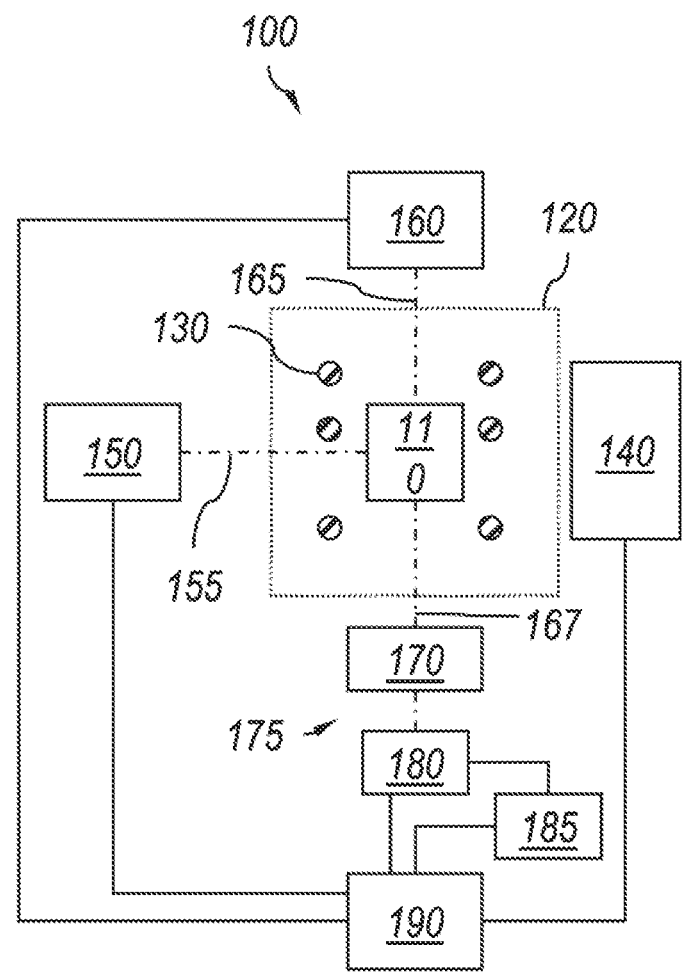
FIG. 1 is a block diagram schematically showing an embodiment of a magnetometer.

Disclosed herein is a pulsed vector magnetometer using a fast-rotating field.

As used herein, the term "fast-rotating" refers to a field rotating with a frequency of greater than or equal to the transverse spin relaxation rate ($\omega_m \geq 1/T_2$), and preferably greater than or equal to π times the transverse spin relaxation rate ($\omega_m \geq \pi/T_2$).

In some embodiments, a vector magnetometer may be provided that can measure three-axis magnetic field simultaneously. It can be achieved by adding a rotating magnetic field to compact scalar magnetometers based on free spin precession, which have realized several $fT/Hz^{1/2}$ gradiometer sensitivity in the earth's ambient environment with multi-pass cells. The magnetometer may extract three-axis vector information and do not degrade its scalar resolution. It may be developed into a very compact size by using the techniques of microelectromechanical systems. Furthermore, the vector axes of the disclosed vector magnetometer may be defined by the coils, it may provide common coordinate system for all the sensors that are integrated with the magnetometer. The plane of the rotating field may rotate freely in three dimensions by changing the currents applied in three coils, which may be kept to be perpendicular to the leading field by feedback control.

A free spin precession magnetometer, which acquires the free induction decay (FID) signals of the atomic precession during the dark. Consequently, the light shift or any systematic noises corresponding to the instability of the pump beam are fully eliminated. The precession signal is analyzed by calculating the phase shifts relative to a reference signal at the Larmor frequency, which can highly reduce the dependence on the stability of the probe beam's power and wavelength and the temperature of the cell. These are very good characteristics for realizing high accuracy magnetometers with a good long-term stability. Moreover, the bandwidth of the FID magnetometer can be extended beyond the Larmor precession frequency by an instantaneous phase retrieval technique. High accuracy atomic magnetometers are essential for some applications, for example, space exploration and dark matter detection that require the magnetometers to maintain its accuracy during its mission time such as several weeks or several months. Which is more challenging than achieving a high sensitivity atomic magnetometer, because it requires to additionally study and eliminate the systematic errors of the atomic magnetometers.

Herein, the systematic effects of the magnetometer was studied, and other than the conventional Berry's phase shift and the static heading error, several new systematic effects are introduced. First, we investigate the dynamic heading error caused by the rotating magnetic field. In order to distinguish between the conventional heading error caused by the static magnetic field, the conventional heading error that depends on the relative orientation of the spin polarization and static leading magnetic field is referred to as static heading error, and the heading error caused by the rotating magnetic field is referred to as dynamic heading error. Note that this keeps the well-known static heading error that caused by the leading static magnetic field, and define the dynamic heading error as heading error that caused by the rotating magnetic field. Therefore, the actual heading error caused by the total magnetic field equals the sum of the static heading error and the dynamic heading error.

Based on the density matrix simulation result and the experimental results, the dynamic heading error can be explained by that the plane of spin precession can adiabatically follow the rotation of the total magnetic field. Moreover, there is a probe beam heading error which induces a fictitious magnetic field along the probe beam and its amplitude depends on the relative orientation of probe beam and the leading magnetic field. Lastly, there is systematic induced by the eddy current, the altering rotating field can generate eddy current on the electrically conductive aluminum or mu-metal magnetic shield, the eddy current then generate a magnetic field. The eddy current magnetic field highly depends on how the rotating magnetic field is switched. Moreover, disclosed is a unique modulation technique by quickly altering the rotation direction of the rotating field to cancel out all these systematic errors.

In some embodiments, a magnetometer may be provided. Referring to FIG. 1, a block diagram schematically lays out an embodiment of a magnetometer 100. As seen, in some embodiments, the magnetometer may include an alkali vapor cell 110 placed substantially in the center of a magnetic shield 120. The vapor cell may be a cubic cell. In some embodiments, the cubic cell may have a length, width, and depth of no more than 10 mm. The alkali vapor cell may contain a droplet of $^{87}Rb$ or another alkali-metal isotope, and $N_2$ as quenching gas and buffer gas at a pressure of a few to a few hundred Torr. A magnetic shield may be used for testing the performance of the magnetometer or reducing AC fluctuations of the external magnetic field. The magnetic shield may include a several-layer mu-metal magnetic shield for attenuating DC magnetic fields and/or an aluminum shield for attenuating the AC magnetic fields from the environment.

In some embodiments, a set of three coils 130 provide a rotating magnetic field and a leading magnetic field.

In some embodiments, the cell may be heated by an electric heater 140. In some embodiments, the AC current may be provided at a predetermined frequency, such as a frequency of 131.5 kHz. In some embodiments, the AC heater may be turned on during the pump time, and turned off during the measurement time to reduce the magnetic noise from the heater.

In some embodiments, the alkali cell may be pumped by a sequence of pump pulses 155 from a pump beam laser source 150, such as a grating-stabilized diode laser. In some embodiments, the pump pulses are directed to the cell indirectly, by reflecting off one or more mirrors. In some embodiments, the frequency of the pump beam pulse may be selected based on the Larmor frequency. In some embodiments, the frequency of the pump beam pulse may be in sync with the Larmor frequency to achieve the highest pumping rate. In some embodiments, the frequency of the pump beam pulse may be set to 348 KHz.

In some embodiments, the pump pulses are directed to the cell without reflecting off a mirror. In some embodiments, the duty cycle of the pump beam laser source may be 15% or less, 10% or less, 5% or less, 4% or less, 3% or less, or 2% or less. In some embodiments, the pump beam laser source may be turned off after a predetermined pump time.

In order to achieve three-axis magnetic field measurement, a rotating magnetic field with a first amplitude is applied in the transverse plane (x-y plane). In some embodiments a leading magnetic field Bz with a second amplitude is applied along the longitudinal direction (z-axis). In other embodiments the leading magnetic field is due to Earth's field or another field to be measured. In some embodiments, the first amplitude is approximately 18 µT, and an amplitude of the total applied magnetic field is kept to approximately 50 µT to simulate the earth field.

After the predetermined pump time, a probe beam 165 from a probe beam laser source 160 may be directed to the alkali cell.

The FID signal of the spin precession may be measured by a linearly polarized probe beam which may originate from, e.g., a vertical cavity surface emitting laser (VCSEL), and passes through the alkali cell. In some embodiments, the probe beam is directed to the cell indirectly, by reflecting off one or more mirrors. The optical rotation of the probe beam, after passing through the alkali cell, may be measured by a balanced polarimeter 175 consisting of a Wollaston prism 170 and a quadrant photodiode 180.

In some embodiments, the signal from the photodiode may goes through various processing circuitry 185, which may include, e.g., a differential low-noise amplifier, and one or more filters, such as a high-pass filter.

In some embodiments, the processed signal may be sent to a controller 190, which may include one or more processors. The controller, which may include a modulation domain analyzer (MDA), analyzes the phase shift of the signal relative to the Larmor frequency. The controller may detect the zero-crossings of the precession signal and a reference signal, then the phase shifts between the zero crossings of the precession signal and reference signal are calculated. In some embodiments, threshold voltage of the MDA is well tuned to avoid curling the measured phase shift signal. If the measured phase shift signal is curled, it will effect the fitting result and lead to a systematic error.

Theory

The spin evolution of the polarized alkali atoms can be described by the Bloch equation $$\frac{dS}{dt} = \gamma B \times S + s_p R_{OP} - (s_p R_{OP} + \Gamma) \cdot S, \quad (1)$$

where S is the electron spin vector, $\gamma$ is gyromagnetic ratio, $B=(B_X, B_Y, B_Z)$ is the magnetic field vector, $s_p$ is the unit vector indicates the pumping direction, $R_{OP}$ is the optical pumping rate, $\Gamma$ is the spin relaxation rate. And a rotating magnetic field with a frequency of $\omega_m$ is applied in the x-y plane, $$B_x = b_x + B_m \sin(\omega_m t + \phi_x), B_y = b_y + B_m \sin(\omega_m t + \phi_y), \quad (2)$$

where $b_x$, $b_y$ are the residual magnetic fields in the x and y direction, respectively. $B_m$ is the amplitude of the rotating field. $\omega_m$ is the frequency of the rotating magnetic field. $\phi_x$ and $\phi_y$ are the phases of the rotating magnetic field in the x and y directions, and $|\phi_x - \phi_y| = 90°$ to keep the modulation magnetic field as a rotating magnetic field.

A. Vector Magnetometry

If there are residual magnetic fields in the x and y direction, and a rotating magnetic field is applied in the x-y plane with $\phi_x = 90°$, $\phi_y = 0°$, the precession frequency of the total magnetic field can be written as $$\gamma[B_z^2 + (b_x + B_m \cos \omega_m t)^2 + (b_y + B_m \sin \omega_m t)^2]^{1/2} \approx \quad (3)$$

$$\gamma\sqrt{B_m^2 + B_z^2} + \frac{\gamma B_m b_x}{\sqrt{B_m^2 + B_z^2}} \cos \omega_m t + \frac{\gamma B_m b_y}{\sqrt{B_m^2 + B_z^2}} \sin \omega_m t$$

$\omega_0 = \gamma\sqrt{B_m^2 + B_z^2}$ was chosen as the reference frequency. Because $\omega_r >> \omega_m$, and subtract $\omega_0 t$ from the integral of Eq. 3, one can get the phase shift relative to $\omega_0$ caused by the transverse magnetic fields in the unit of time as $$\tau_m = \frac{B_m}{\omega_m(B_m^2 + B_z^2)}(-b_x \sin \omega_m t + b_y \cos \omega_m t) \quad (4)$$

The residual magnetic fields in x-direction $b_x$ and y-direction $b_y$ are proportional to the amplitudes of the first harmonic $\sin \omega_m t$ and $\cos \omega_m t$, respectively. And the scale factor equals $B_m/[\omega_m(B_m^2 + B_z^2)]$.

B. Systematic Effects

It is complicated to get analytical solutions of the time-dependent Bloch equation. Instead, one can use rotation matrices to evaluate the spin evolution. When $b_x$, $b_y$ are all zero, and one assumes the spins are fully polarized along minus y-axis initially, and $\phi_x = 90°$, $\phi_y = 0°$, the spin evolution can be written as $$P(t) = RM[-\omega_m t, (0, 0, 1)] \cdot RM\left[-\gamma t \sqrt{B_m^2 + B_z + \frac{\omega_m}{\gamma}}, (B_m, 0, B_z)\right]. \quad (5)$$

$$(0, -1, 0)$$

where $RM[\phi, v]$ is a 3D rotation matrix for a counter-clockwise $\phi$-degree rotation around the 3D vector v. Eventually, the spin projections in three axes can be written as $$P_y(t) = (1, 0, 0) \cdot P(t) = \cos \omega_0 t \sin \omega_m t - \frac{(\gamma B_z + \omega_m)}{\omega_0} \sin \omega_0 t \cos \omega_m t, \quad (6)$$

$$P_y(t) = (0, 1, 0) \cdot P(t) = -\cos \omega_0 t \cos \omega_m t - \frac{(\gamma B_z + \omega_m)}{\omega_0} \sin \omega_0 t \sin \omega_m t, \quad (7)$$

$$P_z(t) = (0, 0, 1) \cdot P(t) = \frac{\gamma B_m}{\omega_0} \sin \omega_0 t, \quad (8)$$

Where $\omega_0 = \gamma\sqrt{B_m^2 + (B_z + \omega_m/\gamma)^2}$. When $\omega_m << \omega_0$, $\omega_0 \approx \gamma\sqrt{B_m^2 + B_m^2}$. When $\omega_m$ is large enough, a small correction of the scale factor of the magnetometer needs to be taken into account. The scale factor equals. $B_m/\{\omega_m[B_m^2+(B_z+\omega_m/\gamma)^2]\}$ and ± depends on the rotation direction of the rotating field.

1. Berry's Phase Shift and Second Harmonic Phase Shift

Figure 3:
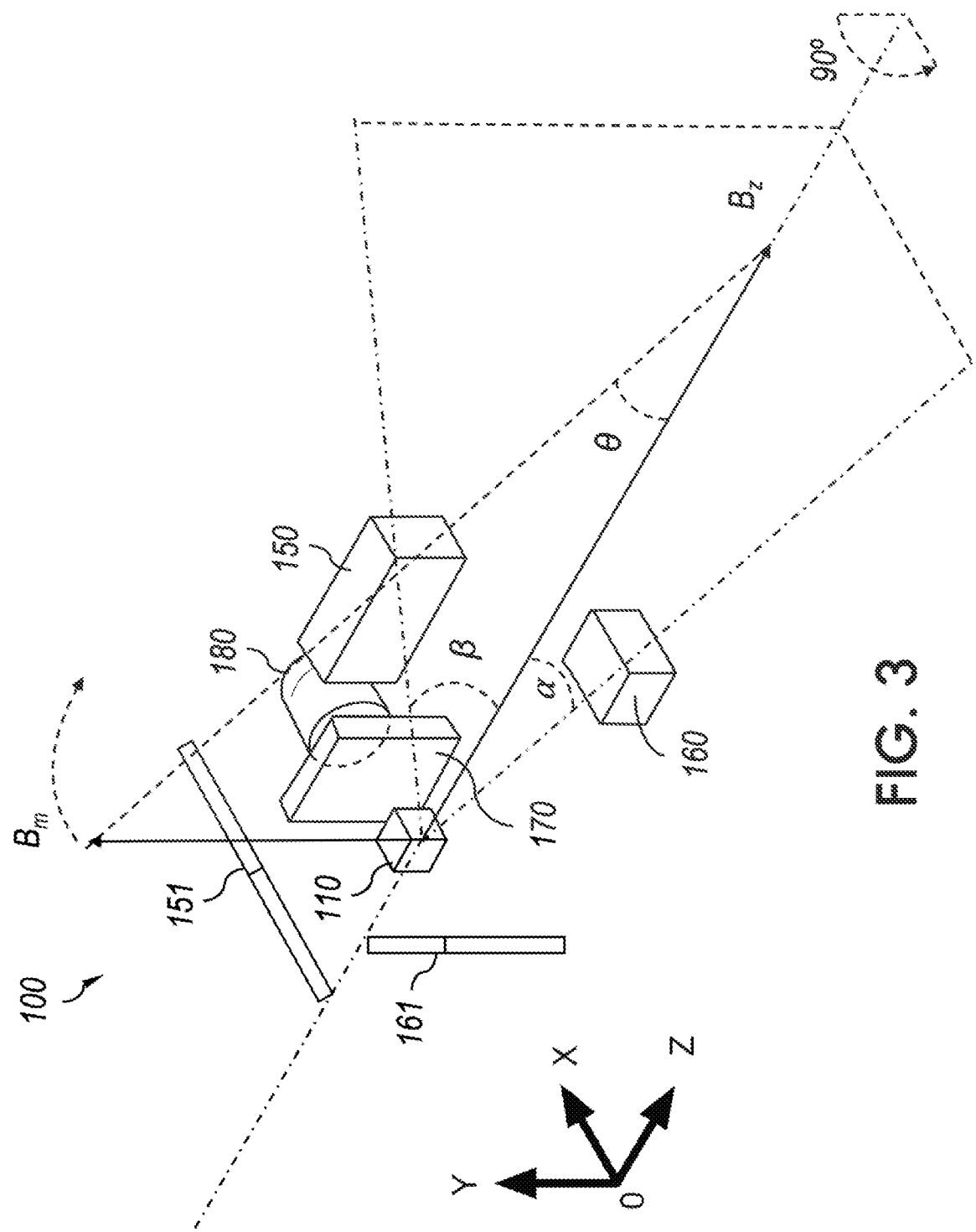
FIGS. 3 and 4 are isometric illustrations of an experimental setup.

By analyzing the phase shifts of Eq. 6, one can get two phase-shift terms contributed from Bm. One is the Berry's phase shift, which can be written in the unit of time as $$\tau_B = \frac{B_m^2 \omega_m t}{2B_z^2 \omega_0} \approx (1-\cos\theta), \qquad (9)$$

where $\theta \approx B_m/B_z$ is the angle between the total magnetic field and z-axis as shown in FIG. 3. Another phase shift from Eq. 7 is proportional to $\sin(2\omega_m t)$, which can be written in the unit of time as $$\tau_{2nd} = -\frac{B_m^2}{4B_z^2 \omega_0} \sin 2\omega_m t. \qquad (10)$$

This term leads to a non-zero second harmonic fitting result even there is no residual magnetic field and the rotating field is perfectly symmetric in the x-y plane. The amplitude of this term in the unit of time equals—$B_m^2/4B_z^2\omega_0$.

2. Pump Beam Heading Error

There is static heading error effect, and the fictitious magnetic field caused by the static heading error can be written as $$B_{SH} \approx B_{HM} \sin\beta, \qquad (11)$$

Where $B_{HM}$ is the maximum static heading error, $$B_{HM} = \frac{P(7+P^2)}{5+3P^2}\frac{3h\gamma B_{tot}^2}{4\pi A_{hf}}, \qquad (12)$$

where P is spin polarization, $A_{hf}$=h·3.417 GHz is the hyperfine structure constant for ground state, h is Planck constant, β is the angle of the pump beam relative to the field. The spin projection along the total magnetic field determines the static heading error.

Figure 2:
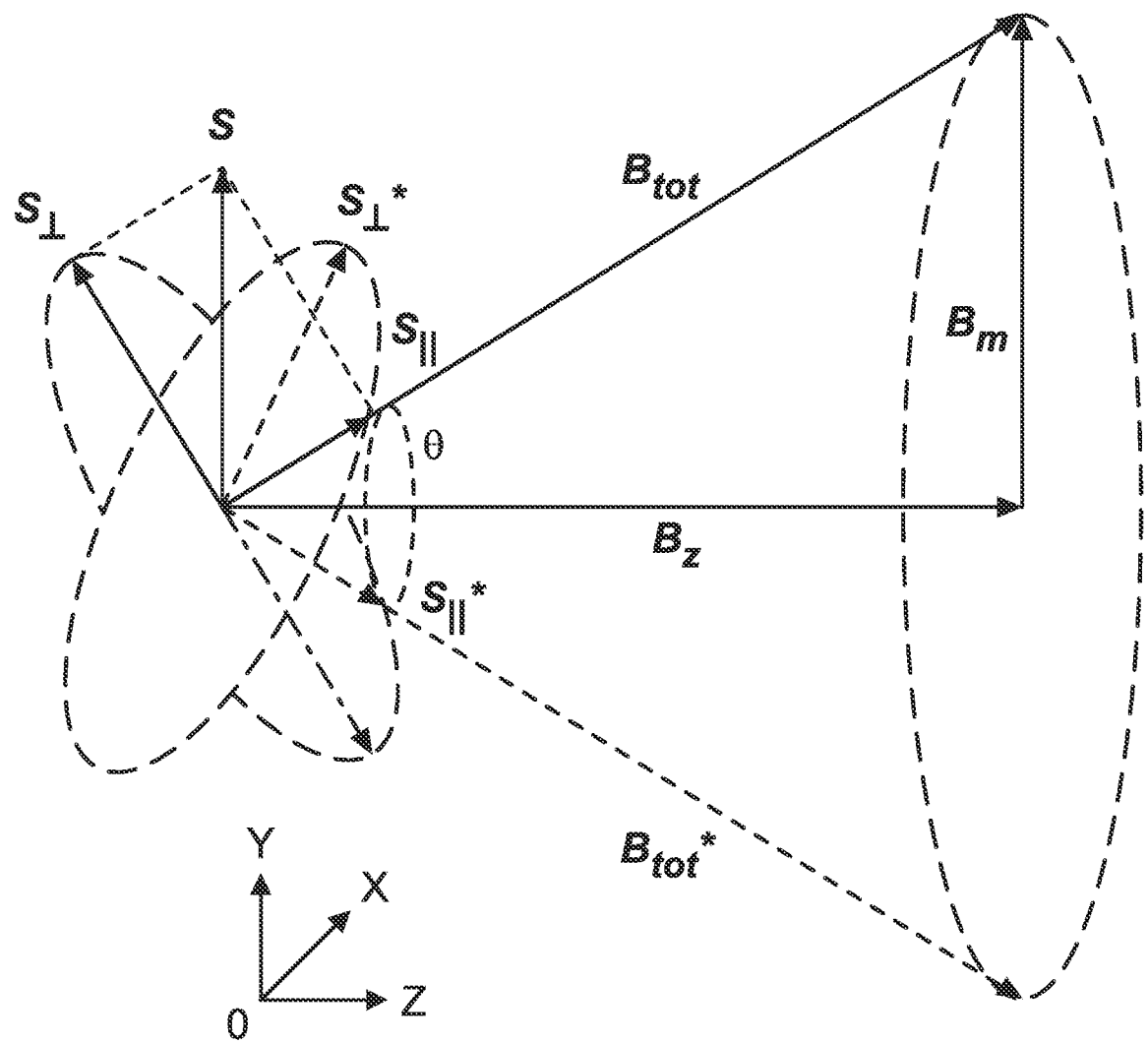
FIG. 2 is a schematic illustration of spin projections.

Other than the conventional static heading error, the rotating magnetic field that was applied may induce a dynamic heading error. When $1/T_2 < 1/T_2 < \omega_m < < \omega_0$, the precession plane of the spin projection $S_\perp$ and the spin projection $S_\parallel$ along the total magnetic field $B_{tot}$ can adiabatically follow the rotation of the total magnetic field $B_{tot}$. In order to understand the dynamic heading error, one can separate the initial spin polarization into two parts as shown in FIG. 2: one is the spin projection ($S_\parallel$) that is along the total magnetic field after pump, another is the spin projection ($S_\perp$) that is perpendicular to the total magnetic field. The previous one results in a constant heading error which is proportional to the initial spin polarization along the total magnetic field, the latter one results in a zero dynamic heading error because its precession plane is always perpendicular to the total magnetic field.

That is, if $B_m$ is initially along S, then S has a nonzero spin projection $S_\parallel$ along $B_{tot}$. $S_\parallel$ is "locked" to $B_{tot}$ and adiabatically follows the rotation of $B_{tot}$. Consequently, the spin projection along $B_{tot}$ is a constant, which induced a dynamic heading error that equals $B_{HM} \sin\theta$. If there is no spin projection along the total magnetic field right after spin polarization: $B_m$ is perpendicular to S right after the pumping pulses, there is no spin project from S to $B_{tot}$, the precession plane of the $S_\perp$ or S adiabatically follows $B_{tot}$ and keeps perpendicular to $B_{tot}$, there will be no spin projection along $B_{tot}$. Consequently, there is no dynamic heading error in this case.

The density matrix model can well describe an ensemble of spins in a mixed state. The dynamic heading error is determined by $S_\perp$, and it can be eliminated by choosing right starting phases of the rotating field that keep $S_\perp=0$ initially.

3. Probe Beam Heading Error

If one assumes the atoms are pumped along the y direction, and the sensor rotates in the x-z plane about the y-axis. One can define the angle between the probe beam and the x axis as cu as shown in FIG. 3. The spin projection along the probe beam can be written as $P_{prob}(t)=P_x(t)\cos\alpha+P_z(t)\sin\alpha$. Inserting the Eqs. 6 and 8, and analyze the first harmonic phase shift that depends on α, we can get the phase shift caused by the probe beam heading error in the unit of time $$\tau_{prob} \approx -\frac{B_m}{B_z \omega_0} \tan\alpha \sin\omega_m t. \qquad (13)$$

Dividing Eq. 13 by the scale factor, and convert it into magnetic field unit. It is equivalent to a fictitious magnetic field $\omega_m/\gamma \cdot \tan\alpha$ along the probe beam direction. To be noted here, the probe beam heading error is not caused by the probe beam pumping effect, it is named as probe beam heading error because it induces a fictitious magnetic field that depends on the relative angle between the probe beam and $B_z$, which is analogous to the pump beam heading error.

As shown in in Table I, the sign of probe heading error depends on the rotation direction. Based on a four-shot scheme discussed below, one can easily calculate α by comparing the difference of the fitting amplitudes of $\sin\omega_m t$ of different directions of the rotating field. It can help to determine the plane of the rotating magnetic field which is perpendicular to $B_z$.

TABLE I

| Shot | $\phi_x$ | $\phi_y$ | $b_x$ | $b_y$ | $\tau_B$ | $\tau_{2nd}$ | $\tau_{pump}$ | $\tau_{prob}$ |
|---|---|---|---|---|---|---|---|---|
| 1 | 90° | 0° | − | + | + | − | − | − |
| 2 | 90° | 180° | − | − | − | + | − | + |
| 3 | 270° | 180° | + | − | + | − | + | − |
| 4 | 270° | 360° | + | + | − | + | + | + |

4. Eddy Current

Figure 7:
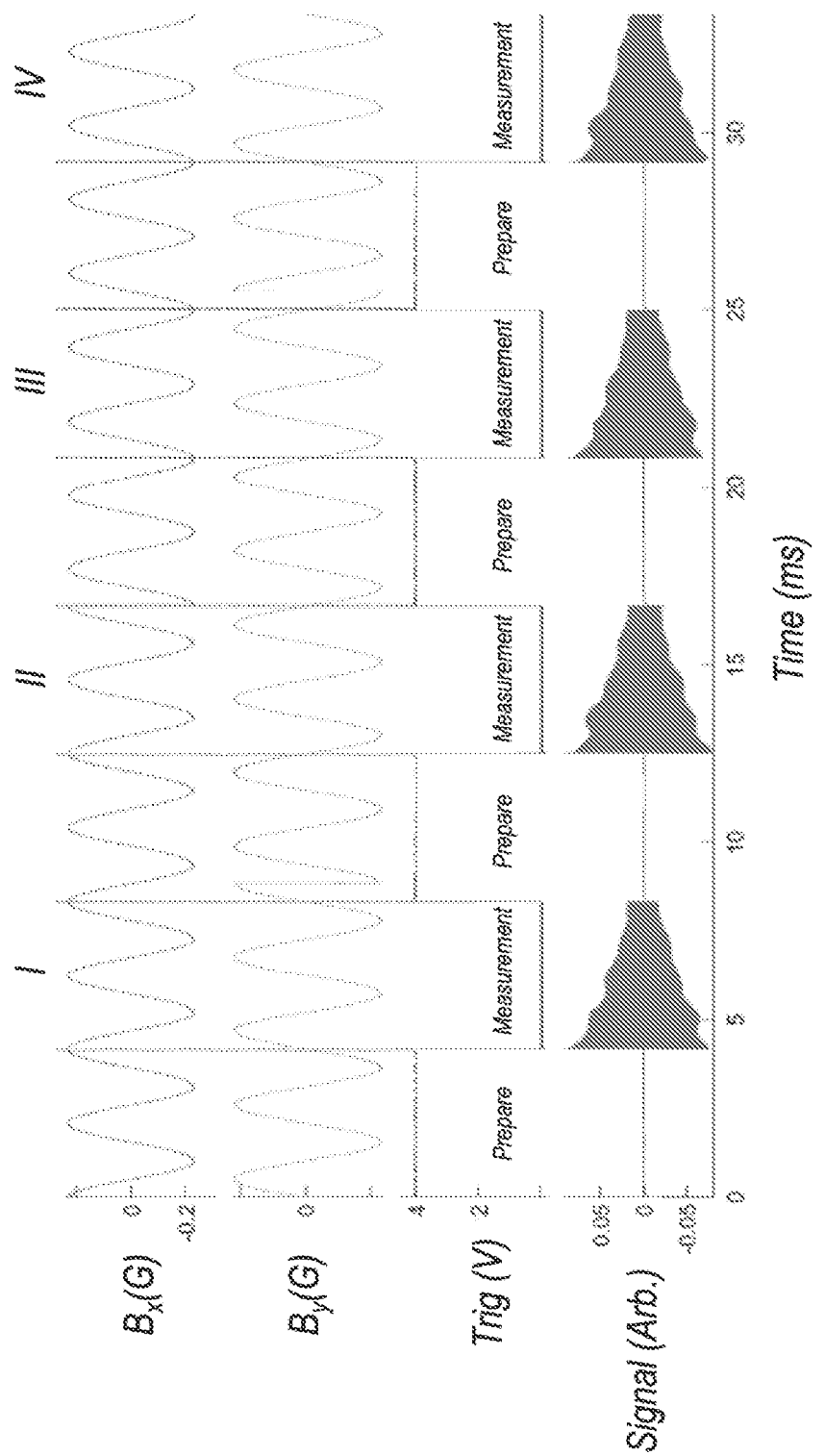
FIG. 7 is a graph showing four shots of different start phases of $B_x$ and $B_y$ at the beginning of each measurement time. This four-shot scheme is specifically developed to cancel out the systematic effects, such as Berry's phase shift, dynamic heading error, probe beam heading error, eddy current and the systematic caused by the threshold voltage of the MDA. In order to suppress the eddy current caused by the rotating field, the magnetic field only flips during the peak values ("cosine switch"). The precession signals were acquired by the quadrant photodiode, the signals were deferentially amplified by a low-noise amplifier (Thorlabs SR560), the signals during the preparing time are blanked out. The signals were further filtered by a first-order high-pass filter with a cutoff frequency of 150 kHz before entering the MDA.

The fast altering rotating magnetic field can generate eddy current on the electrically conductive magnetic shield, consequently, eddy current magnetic fields are generated. As shown in FIG. 7, in the 4-shot scheme, the direction of each modulation magnetic field alters twice per 4 shots. It was discovered how the rotating magnetic field is altered can affect the eddy current magnetic field, which is when the direction alteration of the rotating field happens at the peak values of the rotating magnetic field, which is from negative maximum to positive maximum and vise versa, this was named as "cosine switch", the average magnetic field caused by the eddy current equals zero. However, if the direction alteration of the rotating field happens at zero rotating magnetic field, it can be named as "sine switch" would lead to a big magnetic field caused by the eddy current.

A waveform as shown in FIG. 7 was specifically developed to make sure the rotation direction alteration always happens at the peak values of the adjacent rotating magnetic field (cosine switch), which can mostly eliminate the systematic effect caused by the eddy current. The experimental results are discussed below. The eddy current effect is analogous to a first-order low pass filter, and the cut-off frequency can be calculated by the time constant we measured. One can measure the eddy current time constant by applying the disclosed accurate vector magnetometer.

The signs of the parameters are listed as a function of the phases of the rotating magnetic field in Table I. The signs of the parameters above are based on the rotating field with phases $\phi_x=90°$, $\phi_y=0°$. This is a very important characteristic of these systematic effects, based on which one can finally cancel out them by rapidly altering the direction of the rotating field.

Figure 4:
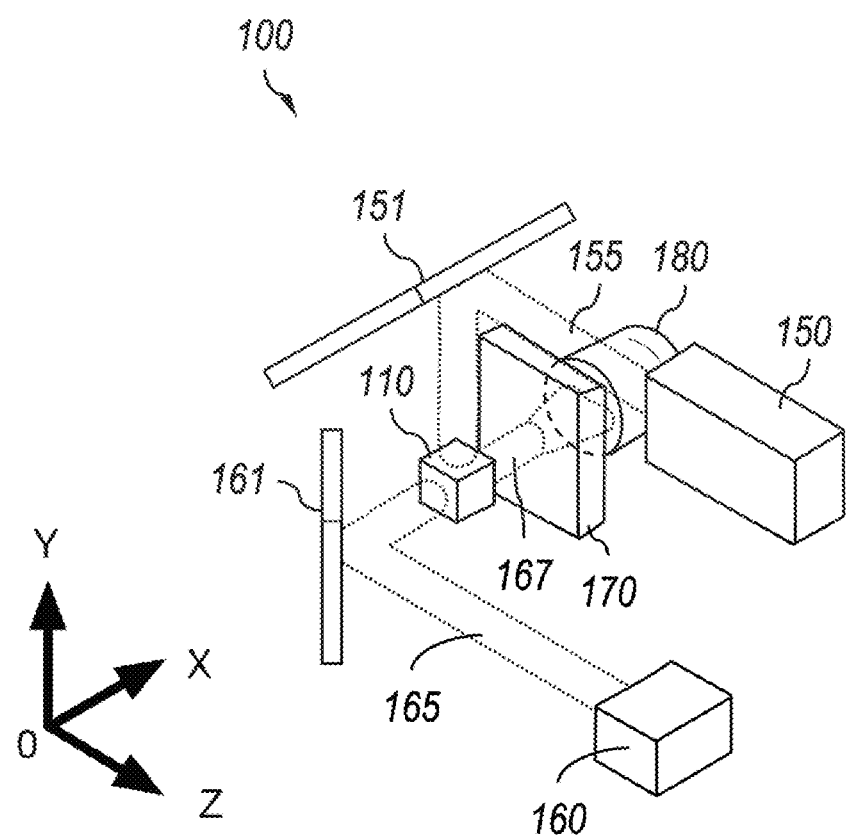

Referring to FIGS. 3 and 4, a 5 mm×5 mm×5 mm cubic alkali vapor cell, containing a droplet of $^{87}$Rb, 688 Torr $N_2$ as a quenching gas and buffer gas, is placed in the center of a magnetic shield consisting of two-layers mu-metal magnetic shield and an innermost-layer aluminum shield. The alkali cell is pumped by a sequence of pump pulses from a grating-stabilized diode laser. A set of three coils inside the magnetic shield provide a rotating magnetic field and a leading magnetic field. The cell is heated by an electric heater driven by AC current at a frequency of 131.5 kHz, the AC heater is turned on during the pump time, and is turned off during the measurement time to reduce the magnetic noise from the heater. In order to achieve three-axis magnetic field measurement, a rotating magnetic field with an amplitude of approximately 18 μT is applied in the transverse plane (x-y plane), a leading magnetic field Bz is applied along the longitudinal direction (z-axis). The amplitude of the total applied magnetic field is kept to approximately 50 μT to simulate the earth field. The frequency of the pump beam pulse is set to 348 kHz which is in sync with the Larmor frequency to achieve the highest pumping rate. The duty cycle of a pump beam pulse is approximately 1.4%. The pump beam is turned off after the pump time, the FID signal of the spin precession is measured by a linearly polarized probe beam which originates from a vertical cavity surface emitting laser (VCSEL), and the optical rotation of the linearly polarized probe beam is measured by a balanced polarimeter consisting of a Wollaston prism and a quadrant photodiode, the signal from the photodiode goes though a differential low-noise amplifier (Thorlabs SR560) and a high-pass filter, the phase shift of the signal relative to the Larmor frequency is analyzed by the HP 53310A modulation domain analyzer (MDA). The MDA detects the zero-crossings of the precession signal and the reference signal, then the phase shifts between the zero crossings of the precession signal and reference signal are calculated.

The measured phase shift from the MDA was further fitted to a model which include the following terms: offset, slope, amplitudes of the first harmonics, second harmonics of $\omega_m$ and amplitudes of the first harmonics of $\omega_{hp}$. The second harmonic of the $\omega_m$ is also included in the fitting model because either second harmonic phase shift described in Eq. 10, or the asymmetries of the rotating field in amplitude or phase, can lead to a signal at a frequency of $2\omega_m$. The Zeeman frequencies are split due to the nuclear magnetic moment. The hyperfine Landé g-factor can be written as $$g_F = g_S \frac{F(F+1) - I(I+1) + S(S+1)}{2F(F+1)} - g_I \frac{F(F+1) - I(I+1) + S(S+1)}{2F(F+1)}. \quad (14)$$

Figure 5:
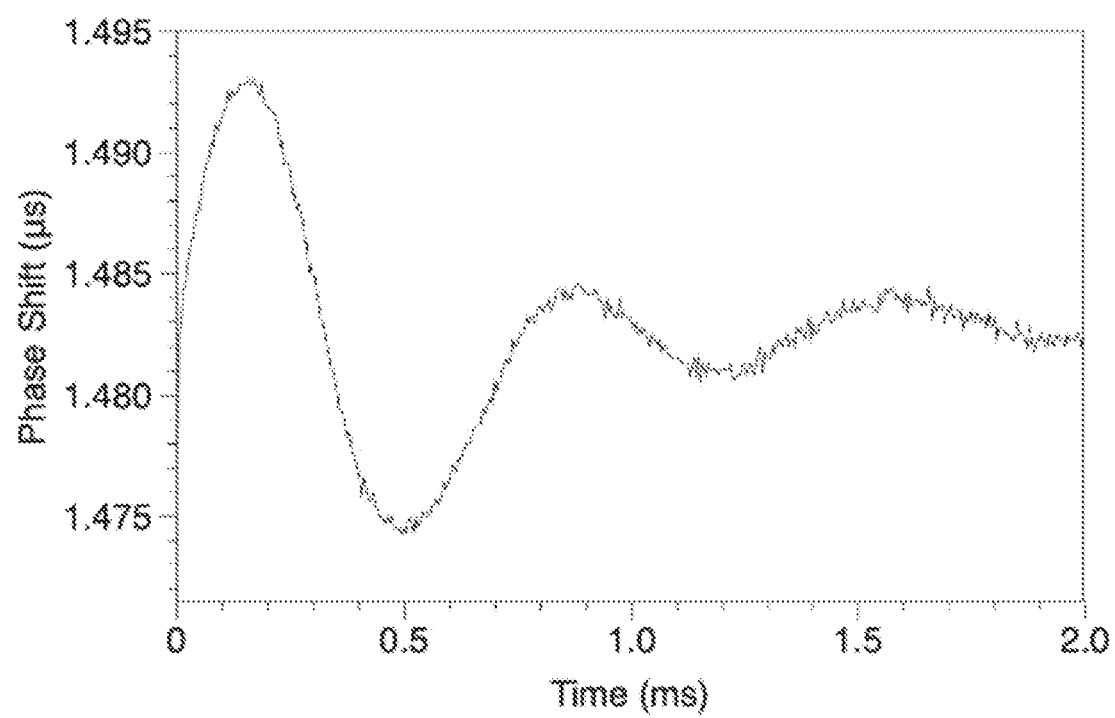
FIG. 5 is a graph showing a difference in the precession frequency for the F=1 and F=2 atoms.

If the alkali atoms are in the earth filed (50 μT), the term with nuclear Landé g-factor $g_I$ cannot be ignored. In the ground state, F=1 the gyromagnetic ratio $\gamma_{F=1}$=−6.9778 Hz/nT, F=2 the gyromagnetic ratio $\gamma_{F=2}$=7.0056 Hz/nT. Consequently, the atoms in these ground states precess oppositely and their precession frequencies have a difference of approximately $\omega_{hp}$=2π×1.39 kHz at the earth field. As shown in FIG. 5, this frequency is measured when the atoms are not fully polarized and there is no rotating magnetic field applied, which can be well described by the density matrix simulation.

As shown in Table I, the sign of the Berry's phase shift is determined by the rotation direction of the rotating field. In a shot where a modulation magnetic field $B_m \cos \omega_m t$ is applied in the x-axis, a modulation magnetic field $B_m \sin \omega_m t$ is applied in the y-axis, which are corresponding to $\phi_x=90°$ and $\phi_x=0°$ in Eq. 2, the magnetic field rotates anti-clockwise. In the following shot, the phases are changed to $\phi_x=90°$ and $\phi_x=180°$, the magnetic field rotates clockwise. Eventually, the rotating magnetic filed rotates in opposite directions for the first and the second shot. The Berry's phase shifts of the first shot and second shot had equivalent amplitudes but with opposite signs, which can be canceled out by averaging the fitting slopes of the first and the second shot.

Figure 6:
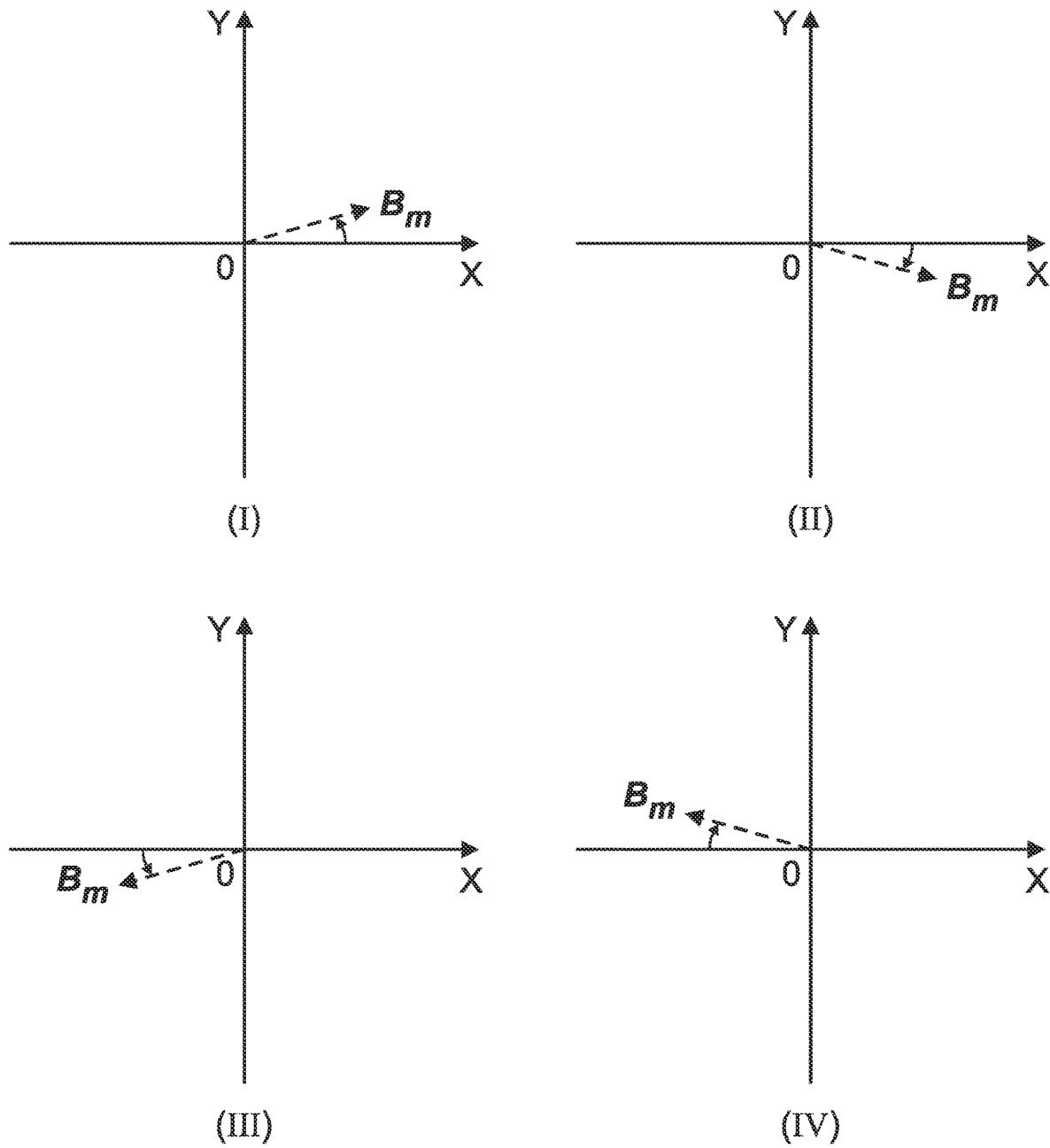
FIG. 6 are graphs showing field rotation for the four shot approach. The phases of the four shots are I: ($\phi_x$=90°, $\phi_y$=0°, II: ($\phi_x$=90°, $\phi_y$=180°, III: ($\phi_x$=270°, $\phi_y$=180°) and IV: ($\phi_x$=270°, $\phi_y$=0°, respectively. For the shot I and II, $B_m$=[$b_m$ sin($\omega_m$t+$\phi_x$), $b_m$ sin($\omega_m$t+$\phi_y$), 0] is along positive x-direction at the beginning of the measurement time, the field rotates along anti-clockwise in shot I, the field rotates clockwise in shot II. For the shot III and IV, $B_m$ is along the negative x-direction at the beginning of the measurement time, the field rotates anti-clockwise in shot III, the field rotates clockwise in shot IV.

The sign of the dynamic heading error due to the effect of non-zero spin projection along the total magnetic field depends on the start sign of the rotating field. In order to cancel out this heading error, one can add extra two shots with opposite start signs and whose start phases are $\phi_x=270°$ and $\phi_x=180°$ and $\phi_x=270°$ and $\phi_x=0°$, moreover, these extra two shots can help to cancel out the systematic error caused by the threshold voltage of the MDA. Finally, as shown in FIG. 6, the rotating field $B_m$ in the x-y plane has different rotate direction and start signs in these four shots.

One can define these four shots in a sequence as one block. The HP 53310A can acquire 80 shots (20 blocks) in one panorama measurement. One block measurement with four shots is shown in FIG. 7, the order of the rotating field of four shots is corresponding to the order of the four shots shown in FIG. 6. When the trigger signal is high, the alkali atoms are pumped and heated. The pump beam and the AC heater are turned off when the trigger signal goes low, the FID signals of the spin precession are acquired. The phase shift relative to the reference signal at the Larmor frequency is analyzed by the MDA.

According to Eq. 4, the $b_x$ and $b_y$ can be measured by fitting the first harmonic of $\omega_m$, $b_x$ and $b_y$ are proportional to the fitting amplitudes of $\sin \omega_m t$ and $\cos \omega_m t$, respectively. The signs of the fitting result for $b_x$ and $b_y$ are shown in Table I, which needs to be considered when averaging the fitting results of the four shots to get the transverse residual magnetic fields.

Figure 8:
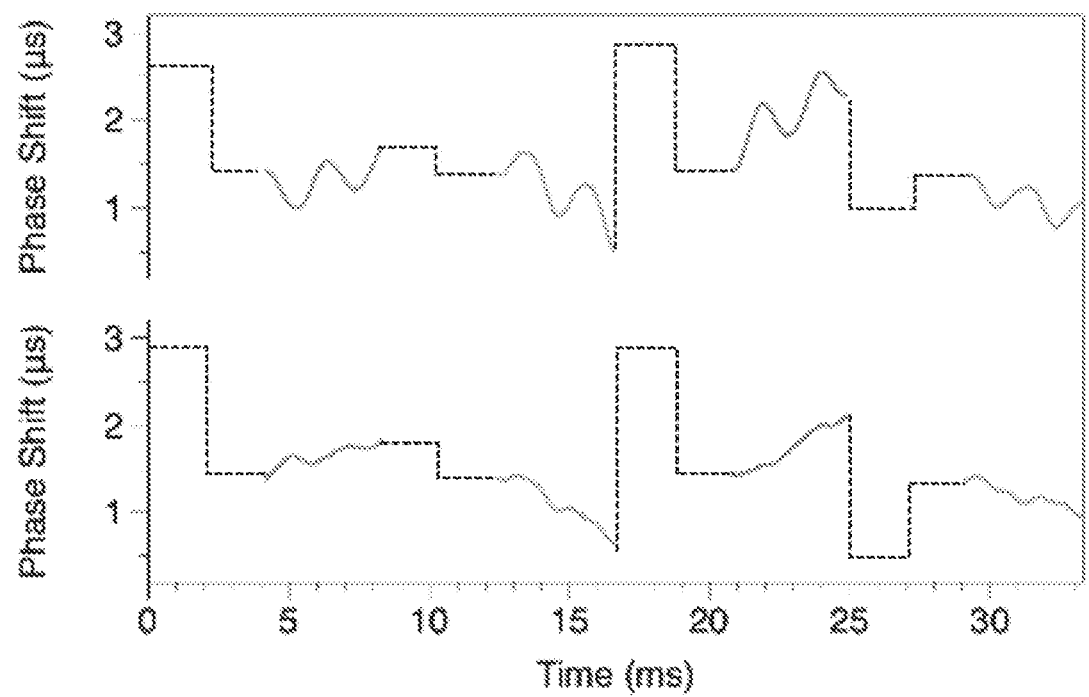
FIG. 8 is a graph showing one block of data acquired by the MDA. Upper: when a magnetic field of −87 nT is applied in the y-direction, one block phase shifts acquired by the MDA as a function of time. Lower: when the magnetic fields in the x and y directions are roughly compensated. The second harmonic signals can be clearly observed.

For instance, when a magnetic field of −87 nT is applied in the y-direction, the frequency of the rotating field $\omega_m = 2\pi \times 480$ Hz, the output from the MDA for one block data is shown in the upper plot of the FIG. 8.

When the magnetic field offsets in the transverse directions are roughly compensated, the phase shifts are as shown in the lower plot of the FIG. 8, the second harmonic signal becomes significant. It is caused by the effect described previously. Furthermore, the asymmetry of the rotating magnetic field can also induce a second harmonic signals. By comparing the fitting result of $\sin 2\omega_m t$ of the first shot and the second shot and remove the common systematic of the second harmonic caused by the asymmetry of the rotating field, one can get the amplitude of $\sin 2\omega_m t$ caused by the systematic $\tau_{2nd}$, the experimental results equals approximately 16 ns. For comparison, the prediction based on Eq. 10, $\tau_{2nd} = 16$ ns.

As shown in Table II, the slope of the fitting result includes contributions from four effects, they are small magnetic field deviation $\delta b_z$ between the reference frequency and $B_z$, $\delta b_z = B_z - \omega_0/\gamma^2$, static heading error ($B_{SH}$), Berry's phase shift ($B_{Berry}$) and dynamic heading error ($B_{DH}$). $\delta b_z$ and $B_{SH}$ can be calculated by averaging four shots, and $\delta b_z$ and $B_{SH}$ can be distinguished by reversing the pumping direction. Alternatively, $B_{SH}$ can be estimated based on the total angle calculated by the measured transverse magnetic field and the total magnetic field, eventually, $\delta b_z$ can be distinguished and measured. $B_{SH}$ can be calculated by averaging of the results of four shots multiplied with +1, −1, +1, −1, respectively. $B_{DH}$ can be calculated by averaging of the result of four shots multiplied with +1, +1, −1, −1, respectively.

TABLE II

| Shot | $\phi_x$ | $\phi_y$ | Slope (nT) |
|---|---|---|---|
| 1 | 90° | 0° | $(\delta b_z + B_{SH}) + B_{Berry} + B_{DH}$ |
| 2 | 90° | 180° | $(\delta b_z + B_{SH}) - B_{Berry} + B_{DH}$ |
| 3 | 270° | 180° | $(\delta b_z + B_{SH}) + B_{Berry} - B_{DH}$ |
| 4 | 270° | 360° | $(\delta b_z + B_{SH}) - B_{Berry} - B_{DH}$ |

A. Dynamic Heading Error

In order to study the heading error, the sensor is rotated 90° anti-clockwise about z-axis as shown in FIGS. 3 and 4, and the atoms are polarized along x-direction and probed along y-direction. The experimental results and the density matrix simulation results as shown in Table. III, when the rotating field (RF) initially starts along S (RF starts ∥ S), there is dynamic heading error of 2.6 nT, which is caused by the spin projection along the total magnetic field and its adiabatic follow of the total magnetic field rotation. If the rotating field starts from the opposite sign, the dynamic heading error becomes −2.6 nT. When the rotating field initially starts perpendicularly to S (RF starts ⊥ S), the dynamic heading error is 0, which is because the spin polarization is perpendicular to the total magnetic field initially and the spin precession plane can adiabatically follows the rotation of the total magnetic field and be perpendicular to it. The average over four shots can cancel out the dynamic heading error. The experimental results of the dynamic heading error and static heading error are smaller than the density matrix simulation because the actual polarization of the spins is approx. 22% smaller than the simulation, which is near 100% polarization. The summary of the experimental results and the theoretical predictions related to $B_{tot}$ based on the density matrix are shown in Table IV.

TABLE III

Measured dynamic heading error along the total magnetic field with $\beta \approx 0°$. "Exp" is the experimental data, "DM is the density matrix simulation result.

| $B_{tot}$ | RF starts ∥ S | | RF Starts ⊥ S | |
|---|---|---|---|---|
| Shot | Exp (nT) | DM (nT) | Exp (nT) | DM (nT) |
| 1 | 2.6 | 3.0 | 0.1 | 0.0 |
| 2 | 2.6 | 3.0 | 0.4 | 0.0 |
| 3 | −2.6 | −3.0 | −0.1 | 0.0 |
| 4 | −2.6 | −3.0 | −0.4 | 0.0 |
| Average | 0.0 | 0.0 | 0.0 | 0.0 |

TABLE IV

The measurement results and the predictions based on the density matrix simulation.

| | Measured | Predicted |
|---|---|---|
| Dynamic heading error for $B_{tot}$ ($\theta \approx 21°$) | 2.6 nT | 3.0 nT |
| Berry's phase for $B_z$tot | 5.1 nT | 4.7 nT |
| Average over 4 shots | 0.0 nT | 0.0 nT |
| Static heading error for $B_{tot}$ ($|\beta| \approx 24°$) | 2.7 nT | 3.1 nT |
| Amplitude of $\sin 2\omega_m t$ | 16 ns | 16 ns |

The dynamic heading error effect in the transverse directions was also evaluated. Due to the fast altering the rotating field in the four shot scheme, there is magnetic field produced by the eddy current. It is discussed in below. In order to eliminate the eddy current effect, the rotating magnetic field is not switched and kept the same for one panorama measurement of MDA. The eddy current caused by magnetic switching at the first shot decays out after approx. 60 ms. The shots were averaged by dumping the beginning 8 shots (approx. 66.7 ms). In the following panorama measurement, the phases of the rotating field were then changed to other phases in the order as shown in Table I and repeat the measurements until the results for all the phases of the 4 shots were gathered. As shown in Table V, no matter the rotating field starts parallel or perpendicular to S, the dynamic heading error effect is close to zero in the x-direction. These small magnetic fields variation can be caused by the systematic of the threshold voltage of the MDA.

TABLE V

The dynamic heading error in $B_x$.

| $B_x$ | RF starts ∥ S | | RF Starts ⊥ S | |
|---|---|---|---|---|
| Shot | Exp (nT) | DM (nT) | Exp (nT) | DM (nT) |
| 1 | −0.1 | 0.1 | −0.1 | 0.0 |
| 2 | 0.5 | 0.1 | 0.1 | 0.0 |
| 3 | −0.1 | −0.1 | 0.1 | 0.0 |
| 4 | −0.2 | −0.1 | 0.2 | 0.0 |
| Average | 0.1 | 0.1 | 0.1 | 0.0 |

The experimental and simulation results of $B_y$ are shown in Table VI. The measured magnetic fields are slightly bigger than the x-direction, because there is one more systematic along the y-direction (now it is probe beam direction), which is the probe beam heading error. If the sensor has a misalignment that causes $\alpha = 1°$, it leads to approximately 1.2 nT probe beam heading error in the y-direction. These magnetic field offsets do not change their signs when the polarization direction is reversed, which further proves that they are not caused by the dynamic heading error.

Overall, the rotating magnetic field can induce dynamic heading error in the total magnetic field measurement. The dynamic heading error can be eliminated by either choosing right start phases for the rotating field that starting the rotating field initially at the direction that is perpendicular to the spin polarization, or averaging the results of four shots. The dynamic heading error does not contribute to the transverse magnetic fields no matter what the starting phases of the rotating field are.

TABLE VI

The dynamic heading error in $B_y$.

| $B_y$ | RF starts ∥ S | | RF Starts ⊥ S | |
|---|---|---|---|---|
| Shot | Exp (nT) | DM (nT) | Exp (nT) | DM (nT) |
| 1 | −1.5 | −0.1 | −0.8 | 0.0 |
| 2 | 0.4 | 0.1 | 0.8 | 0.0 |
| 3 | −0.3 | −0.1 | −1.0 | 0.0 |
| 4 | 1.6 | 0.1 | 1.3 | 0.0 |
| Average | 0.0 | 0.0 | 0.1 | 0.0 |

B. Eddy Current

In the disclosed four-shot scheme that alters the rotation direction, there are two switches in four-shots as shown in FIG. 7, for $B_y$, the switch happens during the preparing time of the second shot, another switch happens during the preparing time of the fourth shot.

Figure 9:
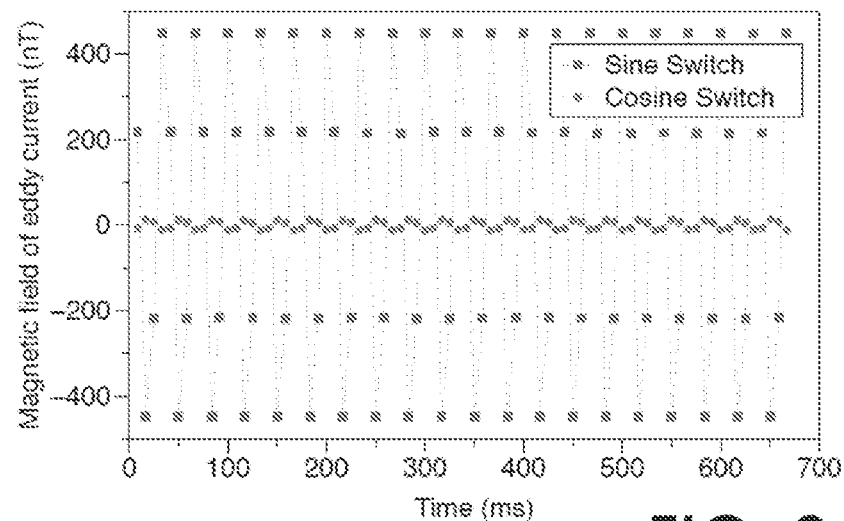
FIG. 9 is a graph showing the magnetic field in transverse direction caused by the eddy current. The magnetic fields measured by both the Sine and Cosine switches are subtracted by 16.6 nT to remove the residual magnetic field.

For $B_y$, the second shot and the fourth shot have the maximum eddy current, the first and third shots have smaller eddy current because they are actually measuring the decaying eddy current generated during the fourth and second shot. The sign of the magnetic field caused by the eddy current depends on the rotation direction of the rotating field, the eddy current magnetic field generated during the second shot has a negative sign, the eddy current magnetic field generated in the fourth shot has a positive sign. The eddy current magnetic field measured during the first shot is the decaying eddy current magnetic field generated during the fourth shot, so the first and the fourth shot has the same sign. In the same way, the second shot and the third shot has the same sign. One panorama (80 shots) measurement result from the MDA is shown in FIG. 9, the sine switch can cause an eddy current magnetic field of approx. 450 nT, and the cosine switch can highly suppress the systematic of the eddy current. The small eddy current magnetic field in "Cosine switch" is due to the imperfection of the cosine switch, the instruments have a certain rising time for a sudden signal transition.

Figure 10:
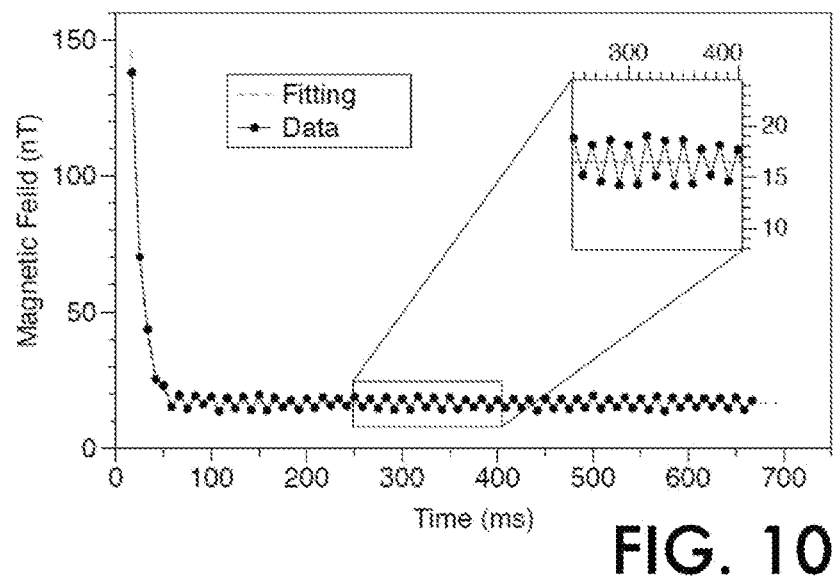
FIG. 10 is a graph showing the measurement of the eddy current time constant.

The time constant of the eddy current is measured by applying a continuous rotating magnetic field with constant phases during one panorama measurement. As shown in FIG. 10, there are 79 data points represent 79 shot measurements, the first shot is dumped because it is too big that it overloads the phase shift range of the MDA. For each shot, it takes 1/120 s. The periodic variations in the magnified picture are caused by the 60 Hz line frequency and its harmonics, it can be averaged out by one panorama measurement. We measured the time constant of eddy current effect for our setup is approximately 10.4 ms, and the corresponding cut-off frequency is 15 Hz.

C. Probe Beam Heading Error

Figure 11:
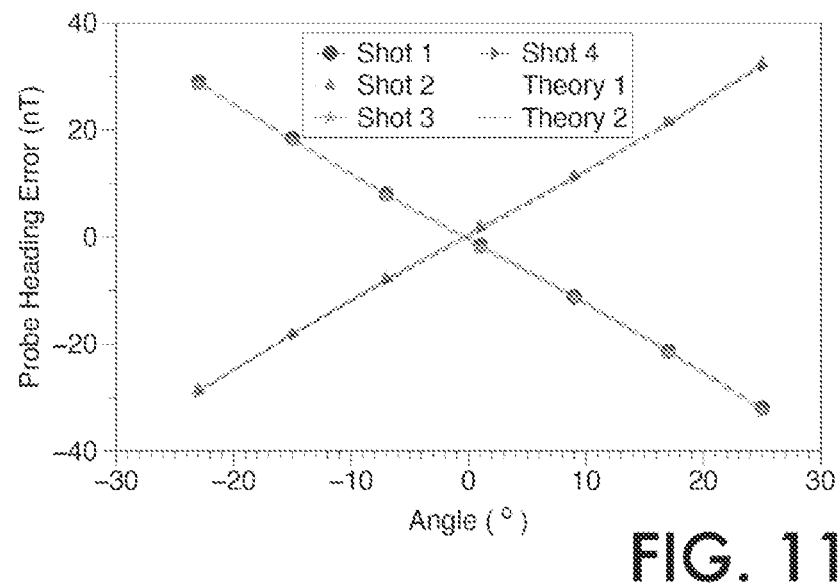
FIG. 11 is a graph showing the measurement of the probe beam heading error. The solid points are experimental results, and the dashed lines are the theoretic plots based on a proposed model.

The probe beam heading error can be described by Eq. 13, and its sign dependence on the $\phi_x$ and $\phi_y$ is shown in Table I. The measured probe heading error when $\omega_m = 2\pi \times 480$ Hz is shown in FIG. 11. The sensor rotates about the pump beam axis, the angle $\alpha$ equals the angle between the probe beam and the $B_z$ minus 90°. The theory is based on Eq. 13. Theory 1 is for anti-clockwise rotations (Shot 1 and Shot 3), which is $-\omega_m/\gamma \cdot \tan \alpha$. Theory 2 is for clockwise rotations (Shot 2 and Shot 4), which is $\omega_m/\gamma \cdot \tan \alpha$. The probe beam heading error can be cancelled out by averaging two opposite rotating field measurements.

D. Performance

Figure 12:
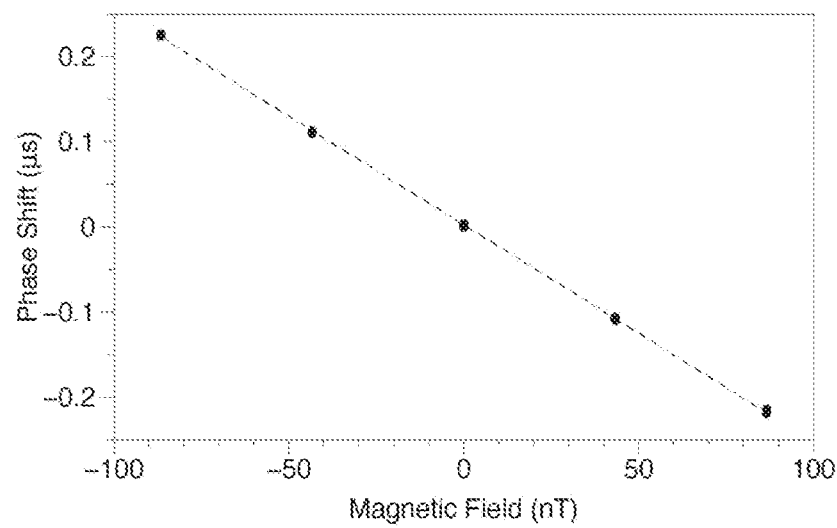
FIG. 12 is a graph showing the linear phase shift signal response to magnetic field sweeping. Each magnetic field has 40 phase shift data points overlap. The experiment was repeated twice by sweeping the magnetic field back and forth, and each panorama has 20 blocks of data.

The magnetic field calibration is shown in FIG. 12. The transverse residual magnetic fields are measured by the fitting amplitudes of the first harmonic of $\omega_m$. In order to evaluate the accuracy of the transverse magnetic field, the magnetic field in the y-axis is swept from −52 nT to 52 nT. The calibrated scale factor is 2.55 ns/nT, the theoretical scale factor is given by $B_m/[\omega_m(B_m^2+B_z^2)]=2.53$ ns/nT, where $B_m \approx 19$ µT. There are 20 blocks of data in one panorama measurement of the MDA, and the panorama measurement of each magnetic field is repeated twice by sweeping the magnetic field back and forth.

Figure 13:
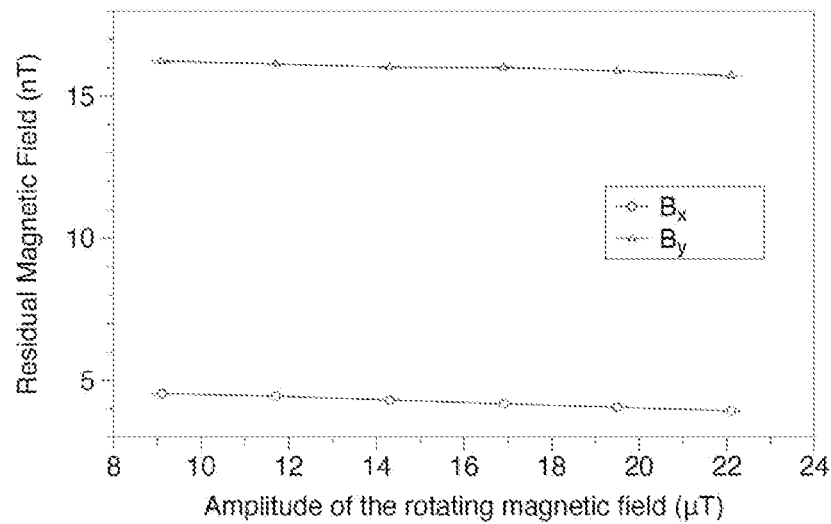
FIG. 13 is a graph showing the measured transverse residual magnetic fields as a function of the amplitude of the rotating field. The measurement of each data point is repeated 10 times.
Figure 14:
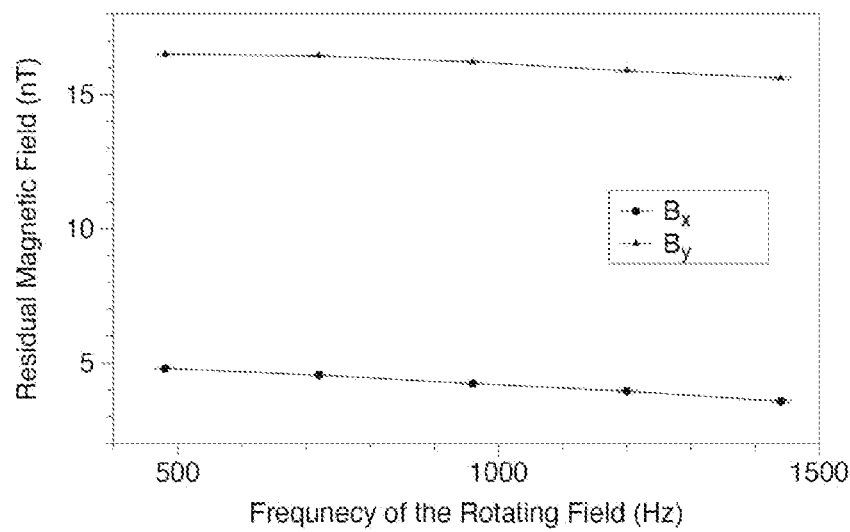
FIG. 14 is a graph showing the measured transverse residual magnetic fields as a function of the frequency of the rotating field. The measurement of each data point is repeated 10 times.
Figure 15:
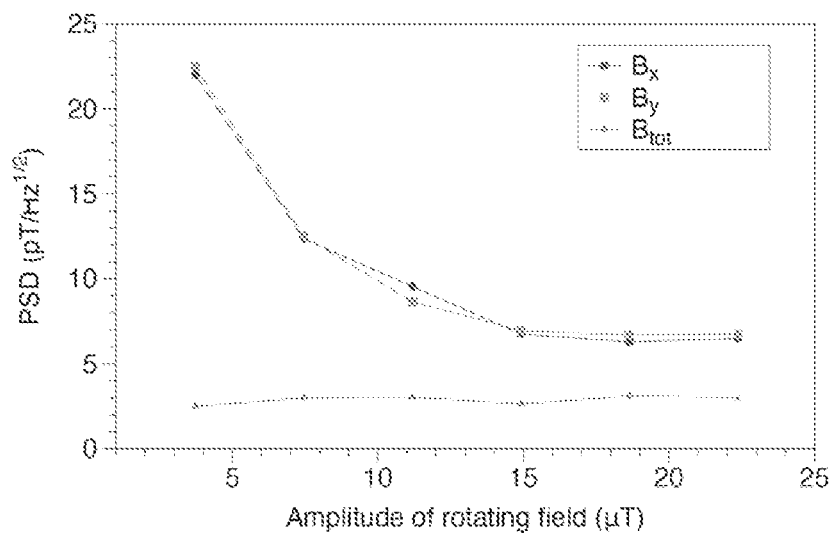
FIG. 15 is a graph showing the sensitivity of the scalar total magnetic field measurement is independent of the rotating field, and the rotating field doesn't degrade the scalar performance. The sensitivities of the two transverse-direction magnetic field measurement are reversely proportional to the amplitude of the rotating field $B_m$, because $B_{tran}$ is proportional to csc θ. Moreover, the transverse magnetic fields indicate two polar angles defining the magnetic field vector.

The amplitude and the frequency of the rotating field are two key parameters of the rotating field. The dependences of the magnetic field measurement results on these two parameters are evaluated. The amplitude of the rotating field is swept from 9 µT to 22 µT, the measured $B_x$ and $B_y$ only decrease by 0.5 nT, which is shown in FIG. 13. The frequency of the rotating field is swept from 480 Hz to 1440 Hz, the measured $B_x$ and $B_y$ decrease within 1 nT, which is shown in FIG. 14. The higher frequency of the rotating field will result in a higher requirement of the accuracy of the timing of the system, because higher $\omega_m$ results in a lower period, the phase shift in the unit of time becomes smaller.

The noise of the magnetometer is described by the power spectral density as shown in FIG. 13. The sensitivities of $B_x$ and $B_y$ improve as the amplitude of the rotating field increases, which, in this example, reach their best sensitivity of approximately 6 pT/Hz$^{1/2}$ when the amplitude of the rotating field is larger than 15 µT. The sensitivity of Bz is approximately 3 pT/Hz$^{1/2}$, which is independent of the amplitude of the rotating field, the rotating magnetic field does not degrade the scalar resolution, the sensitivity of $B_{tot}$ is limited by the noise from the current source that drives the leading field $B_z$.

Fundamental Limit

The spin projection along the transverse direction is measured by the optical polarimeter. The optical rotation can be written as $$\Theta = kP_x = \frac{1}{2} lr_e cfnP_x D(v), \tag{15}$$

where k=$lr_e$cfnD(v)/2, l is the length of probe beam travel though the cell, $r_e$ is the classical electron radius, f is the typical oscillator strength of the D line transition, $D(v)=(v-v_0)/[(v-v_0)^2+(\Delta v/2)^2]$, where $\Delta v$ is the optical FWHM (full width at half maximum), $v_0$ is the frequency of the D line transition.

The noise of the measurement of the precession signal is from the photon shot noise of the probe beam, and the power spectral density of the shot noise in the rotation angle can be written as $$\rho_\Theta = \sqrt{\frac{1}{2\Phi_{pr}}}, \tag{16}$$

where $\Phi_{pr}$ is the total flux of photons of the probe beam per unit time.

The limit of the phase estimation of the sinusoidal signal $k \sin(\omega t+\psi)+w$ can be given by Cramer Rao Lower Bound (CRLB)

$$\sigma_\psi \geq \frac{\rho_\Theta}{k\sqrt{t}}, \tag{17}$$

where w is additive white Gaussian noise (AWGN), whose power spectral density is $\rho\Theta$. In the experiment, the free spin precession signal damps exponentially with a transverse relaxation time $T_2$, if precession frequency $\omega_0 \gg 1/T_2$, the phase shift noise can be considered as a white Gaussian noise during each precessing period $\Delta t = 2\pi/\omega_0$.

$$\sigma_\psi \geq \frac{\rho_\Theta}{k\sqrt{t}} e^{\frac{m\Delta t}{T_2}}, m = 0, 1, 2 \ldots M-1, \tag{18}$$

where M is the period number of $\Delta t$, and the measurement time $t=M\Delta t$. After the phase shift is measured, the slope of the phase shift is fitted to obtain the total magnetic field. And the slope equals the $(\omega-\omega_0)/\omega_0$, the power spectral density of the noise of $\omega$ measurement can be calculated by the Minimum-Variance Unbiased (MVU) estimation.

$$\rho(\omega) \geq \frac{\rho_\Theta}{k\sqrt{t}}\sqrt{2M \cdot \kappa_1(M)}, \text{ where} \tag{19}$$

$$\kappa_1(M) = \frac{(1-z^2)^3(1-z^{2M})}{z^2+z^{2+4M}-z^{2M}(2z^2+M^2(1-z^2)^2)}, \tag{20}$$

where $z=e^{-\Delta t/T_2}$. The power spectral density $\rho(\omega)$ in Eq. 19 has a minimum when the measurement time $t \approx 2T_2$. And the total magnetic field measurement sensitivity is given by $$\delta B_{tot} \geq \frac{4}{\gamma k T_2 \sqrt{\Phi_{pr}}}, \tag{21}$$

For the transverse magnetic fields $b_x$ and $b_y$ are measured by fitting the amplitude of $\sin \omega_m t$ and $\cos \omega_m t$ in the phase shift, respectively.

The power spectral density of the noise of the amplitude estimation of a sinusoidal signal can be written as $$\rho(A) \geq \frac{\rho_\Theta}{k}\sqrt{2M \cdot \kappa_2(M)}, \tag{22}$$

Where $\kappa_2$ is given by $$\kappa_2(M) = \frac{2(1-z^2)}{1-z^{2M}} \approx \frac{4\Delta t}{T_2(1-e^{-\frac{2t}{T_2}})}, \tag{23}$$

and $\delta B_{tran} = \rho(A) \cdot \omega_m \sqrt{B_z^2+B_m^2}/(\gamma B_m)$, we can have the transverse magnetic field measurement sensitivity $$\delta B_{tran} \geq \frac{\omega_m \csc\theta}{\gamma k\sqrt{\Phi_{pr}}}\sqrt{M \cdot \kappa_2(M)}. \tag{24}$$

Different from the total magnetic field measurement, the power spectral density of the transverse magnetic field measurement noise keeps increasing with longer measurement time. If the measurement time is short enough, $\kappa_2 \to 2\Delta t/t$, and the transverse magnetic field measurement sensitivity is given by $$\delta B_{tran} \geq \frac{\sqrt{2}\,\omega_m \csc\theta}{\gamma k\sqrt{\Phi_{pr}}}. \tag{25}$$

If one keeps the measurement time the same as the optimized measurement time of the total magnetic field $t=2T_2$, then the transverse magnetic field measurement sensitivity is given by $$\delta B_{tran} \geq \frac{2\sqrt{2}\,\omega_m \csc\theta}{\gamma k\sqrt{\Phi_{pr}}}. \tag{26}$$

The derived fundamental sensitivities of measuring the scalar magnetic field and transverse magnetic field are based on the assumption that the fitting of the scalar magnetic field and the transverse magnetic fields are independent, it is not an accurate assumption when the modulation frequency is not high enough. One can get analytical solution of magnetic field measurement sensitivities that the scalar magnetic field and transverse magnetic fields are fitted at the same time, it can be done by the Minimum-Variance Unbiased (MVU) estimator. The results are more complicated, however, it turns out that when the modulation frequency is fast enough ($\omega_m \gtrsim \pi/T_2$), the fundamental sensitives are almost the same as considering them independently. For comparison, the fundamental sensitivity of the transverse magnetic field of the sequential modulation vector magnetometers can be described as $$\delta B_{TS} = \frac{4\sqrt{2}}{\gamma k T_2 \sin\theta \sqrt{\Phi_{pr}}} \tag{27}$$

If one assumes $\omega_m = \pi/T_2$, The sensitivity of the transverse magnetic field of our fast rotating field vector magnetometer can be written as $$\delta B_{tran} \geq \frac{2\sqrt{2}\,\pi}{\gamma k T_2 \sin\theta \sqrt{\Phi_{pr}}}. \qquad (28)$$

The fast rotating field vector magnetometer has a comparable sensitivity of measuring the transverse magnetic fields compared with the sequential modulation vector magnetometers. Moreover, the fast rotating field magnetometer has a higher bandwidth and experience less systematic. In the experiment, the measured standard deviation of the phase $\sigma_\psi = 2\pi \times 3 \times 10^{-4}$, one can estimate the sensitivity limits $\delta B_{tot} = 0.3$ pT/$\sqrt{Hz}$ and $B_{tran} = 3$ pT/$\sqrt{Hz}$ based on Eqs. 19 and 22. The total magnetic field sensitivity $\delta B_{tot}$ is limited by the noise from the current source (Arroyo 6300 Series Combo-Source), which provide approximately 650 mA current to generate the leading magnetic field along z-axis, and whose power spectral density noise measured by Keithley DMM7510 is approximately 50 nV/$\sqrt{Hz}$, which leads to a magnetic field noise floor of 3 pT/$\sqrt{Hz}$. When the Arroyo current source was replaced with SRS DC205 DC Voltage Source, the sensitivity was slightly improved to 2 pT/$\sqrt{Hz}$ in the vector mode, because it doesn't have enough bandwidth to compensate the small current fluctuation caused by the cross-talk between the transverse coils and the longitudinal coil as the Arroyo current source. If the rotating fields are turned off to avoid the cross-talk, and the sensitivity of the scalar magnetic field measurement can reach 0.5 PT/$\sqrt{Hz}$, it is then limited by the performance of the alkali cell and the optical system.

If a multi-pass cell with l=1 cm and the probe beam can 10 times multi-pass is used, $T_2 = 3$ ms, $\omega_m = 480$ Hz, $\theta = 30°$, the probe beam power equals 2 mW, the projected sensitivities $\delta B_{tot} = 218$ aT/$\sqrt{Hz}$ and $\delta B_{tran} = 3$ fT/$\sqrt{Hz}$.

Thus, this demonstrates a vector magnetometer which can measure three-axis magnetic fields simultaneously, it is realized by via the use of a rotating magnetic field. Also investigated were several systematics that are specifically introduced in this paper, which are dynamic heading error, probe beam heading error, eddy current and second harmonic phase shift. The four-shot scheme was designed by fast altering the rotating magnetic field to cancel out these systematics. These study of systematics and technologies are useful to develop high accuracy vector magnetometers. Further, analytical fundamental limits of the magnetometer in measuring the total scalar magnetic field and the transverse magnetic fields were proposed.

In some embodiments, the example single-pass small cell used to study the vector magnetometer and its systematic effects can be modified, by replacing the single-pass cell with two multi-pass cells with a gradiometer arrangement. It can keep the scalar magnetic field measurement sensitivity of several fT/Hz$^{1/2}$, as well as simultaneously measure two polar angles defining the magnetic field vector at a sensitivity of fT/Hz$^{1/2}$.

In some embodiments, a pulsed vector atomic magnetometer may be provided. The pulsed vector atomic magnetometer may include an alkali cell within a magnetic shield. The pulsed vector atomic magnetometer may include a pump laser source configured to generate a pulsed pump laser to interact with the alkali cell. The pulsed vector atomic magnetometer may include a probe laser source configured to generate a probe laser to interact with the alkali cell. The pulsed vector atomic magnetometer may include a balanced polarimeter configured to detect the probe laser after passing through the alkali cell. The pulsed vector atomic magnetometer may include three electromagnetic coils. The pulsed vector atomic magnetometer may include at least one processor, the at least one processor configured to: (1) control current applied to the three magnetic coils to generate a rotating magnetic field which can rotate freely in three dimensions and interacts with the alkali cell; and (2) modulate the rotating magnetic field and utilizing the probe laser to simultaneously measure a magnitude and two polar angles of a total magnetic field vector, wherein the frequency of the rotating magnetic field is greater than or equal to the transverse spin relaxation time.

It is understood that the at least one processor may be operably coupled to a non-transitory computer readable medium containing instructions that, when executed, configured the at least one processor to perform specific steps as disclosed herein.

In some embodiments, the at least one processor may be further configured to calculate phase shifts of the detected probe laser relative to a reference signal at the Larmor frequency. In some embodiments, the at least one processor may be further configured to calculate phase shifts between zero crossings of a precession signal and reference signal.

In some embodiments, the rotating magnetic field may have a predetermined amplitude in a transverse plane relative to the ambient magnetic field.

In some embodiments, modulating the magnetic field may include periodically changing the sense of rotation of the applied rotating magnetic field. In some embodiments, modulating the magnetic field may include periodically changing the sign of the applied rotating field with a predetermined pattern. In some embodiments, modulating the magnetic field may include changing the plane of rotation for the applied rotating field. In some embodiments, modulating the magnetic field may include utilizing a four-shot sequence to change the sense of rotation, sign, and/or plane of rotation of the applied rotating field. In some embodiments, the frequency of the rotating magnetic field may be greater than or equal to $\pi$ times the transverse spin relaxation time.

Figure 16:
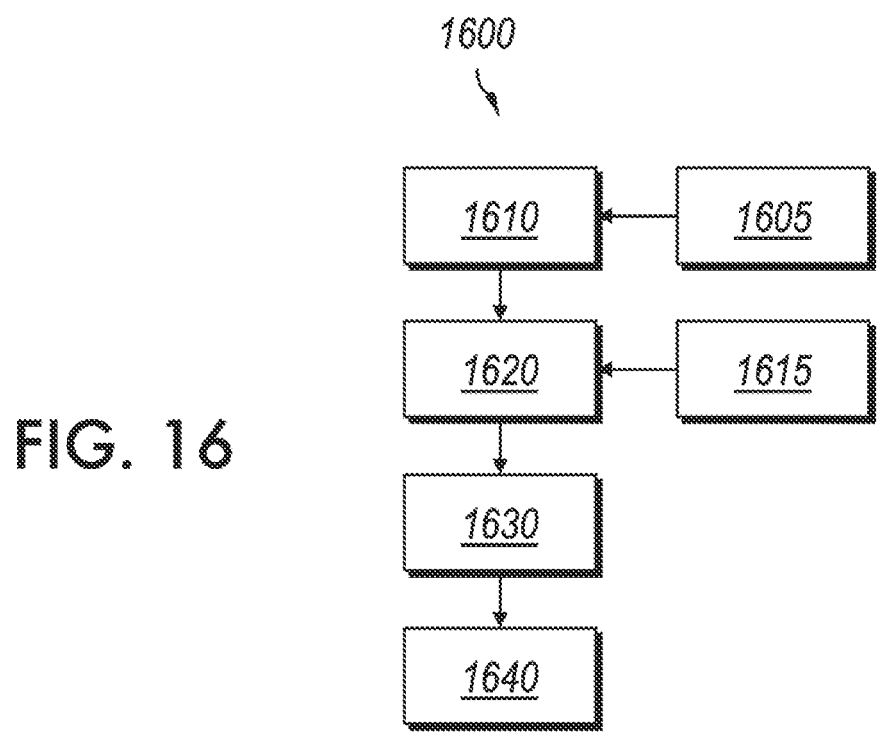
FIG. 16 is a flowchart of a method.

In some embodiments, a method for measuring three vector components of a magnetic field using an atomic magnetometer may be provided. Referring to FIG. 16, the method 1600 may include generating 1605 a pulsed pump laser beam from a pump laser source and directing it to an alkali cell.

The method may include controlling 1610 current applied to three magnetic coils around the alkali cell to generate a rotating magnetic field which can rotate freely in three dimensions and interacts with the alkali cell.

The method may include modulating 1620 the magnetic field and utilizing a probe laser beam (generated 1615 by a probe laser source and directed through the alkali cell) to simultaneously measure a magnitude and two polar angles of a total magnetic field vector, wherein the frequency of the rotating magnetic field is greater than or equal to the transverse spin relaxation time.

In some embodiments, the rotating magnetic field may have a predetermined amplitude in a transverse plane relative to the ambient magnetic field. In some embodiments, modulating the magnetic field may include periodically changing the sense of rotation of the applied rotating magnetic field. In some embodiments, modulating the magnetic field may include periodically changing the sign of the applied rotating field with a predetermined pattern. In some embodiments, modulating the magnetic field may include In some embodiments, modulating the magnetic field may include utilizing a four-shot sequence to change the sensor of rotation, sign, and/or plane of rotation of the applied rotating field. In some embodiments, the frequency of the rotating magnetic field is greater than or equal to $\pi$ times the transverse spin relaxation time.

The method may include detecting 1630 the probe laser after passing through the alkali cell, e.g., with a balanced polarimeter.

The method may include calculating 1640 various quantities based on the detected probe laser. In some embodiments, the method may include calculating phase shifts of the detected probe laser relative to a reference signal at the Larmor frequency. In some embodiments, the method may include calculating phase shifts between zero crossings of a precession signal and reference signal.

The disclosed approach provides a method for measurements of 3 vector components of the magnetic field using an atomic magnetometer. It provides for a method of magnetic field modulation that allows one to measure simultaneously the magnitude and 2 polar angles of the total magnetic field vector. The disclosed method reduces several sources of systematic effects to achieve an accurate measurement of the vector magnetic field. The disclosed method of measurements comprises applying particular excitation to magnetic field coils and extracting signals from an atomic magnetometer in a particular way.

It will be understood by those of skill in the art that the disclosed approach is a fairly general method that fundamentally depends on vector properties of magnetic fields, and that the technique can be applied to other atomic magnetometer approaches.

Embodiments of the present disclosure are described in detail with reference to the figures wherein like reference numerals identify similar or identical elements. It is to be understood that the disclosed embodiments are merely examples of the disclosure, which may be embodied in various forms. Well known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Those skilled in the art will recognize or be able to ascertain using no more than routine experimentation many equivalents to the specific embodiments of the invention described herein. Such equivalents are intended to be encompassed by the following claims.

What is claimed:

1. A pulsed vector atomic magnetometer, comprising:
an alkali cell;
a pump laser source configured to generate a pulsed pump laser to interact with the alkali cell;
a probe laser source configured to generate a probe laser to interact with the alkali cell;
a balanced polarimeter configured to detect the probe laser after passing through the alkali cell;
three electromagnetic coils; and
at least one processor, the at least one processor configured to:
control current applied to the three magnetic coils to generate a rotating magnetic field which can rotate freely in three dimensions and interacts with the alkali cell; and
modulate the rotating magnetic field and utilizing the probe laser to simultaneously measure a magnitude and two polar angles of a total magnetic field vector, wherein the frequency of the rotating magnetic field is greater than or equal to the transverse spin relaxation time.

2. The pulsed vector atomic magnetometer according to claim 1, wherein the at least one processor is further configured to calculate phase shifts of the detected probe laser relative to a reference signal at the Larmor frequency.

3. The pulsed vector atomic magnetometer according to claim 1, wherein the at least one processor is further configured to calculate phase shifts between zero crossings of a precession signal and reference signal.

4. The pulsed vector atomic magnetometer according to claim 1, wherein the rotating magnetic field has a predetermined amplitude in a transverse plane relative to the ambient magnetic field.

5. The pulsed vector atomic magnetometer according to claim 1, wherein modulating the magnetic field includes periodically changing the sense of rotation of the applied rotating magnetic field.

6. The pulsed vector atomic magnetometer according to claim 1, wherein modulating the magnetic field includes periodically changing the sign of the applied rotating field with a predetermined pattern.

7. The pulsed vector atomic magnetometer according to claim 1, wherein modulating the magnetic field includes changing the plane of rotation for the applied rotating field.

8. The pulsed vector atomic magnetometer according to claim 1, wherein modulating the magnetic field utilizes a four-shot sequence to change the sensor of rotation, sign, and/or plane of rotation of the applied rotating field.

9. The pulsed vector atomic magnetometer according to claim 8, wherein the frequency of the rotating magnetic field is greater than or equal to $\pi$ times the transverse spin relaxation time.

10. A method for measuring three vector components of a magnetic field using an atomic magnetometer, comprising:
controlling current applied to three magnetic coils in a magnetic shield around an alkali cell to generate a rotating magnetic field which can rotate freely in three dimensions and interacts with the alkali cell; and
modulating the magnetic field and utilizing a laser directed through the alkali cell to simultaneously measure a magnitude and two polar angles of a total magnetic field vector, wherein the frequency of the rotating magnetic field is greater than or equal to the transverse spin relaxation time.

11. The method according to claim 10, further comprising detecting the probe laser after passing through the alkali cell with a balanced polarimeter.

12. The method according to claim 11, further comprising calculating phase shifts of the detected probe laser relative to a reference signal at the Larmor frequency.

13. The method according to claim 11, further comprising calculating phase shifts between zero crossings of a precession signal and reference signal.

14. The method according to claim 10, wherein the rotating magnetic field has a predetermined amplitude in a transverse plane relative to the ambient magnetic field.

15. The method according to claim 10, wherein modulating the magnetic field includes periodically changing the sense of rotation of the applied rotating magnetic field.

16. The method according to claim 10, wherein modulating the magnetic field includes periodically changing the sign of the applied rotating field with a predetermined pattern.

17. The method according to claim 10, wherein modulating the magnetic field includes changing the plane of rotation for the applied rotating field.

18. The method according to claim 10, wherein modulating the magnetic field utilizes a four-shot sequence to change the sensor of rotation, sign, and/or plane of rotation of the applied rotating field.

19. The method according to claim 18, wherein the frequency of the rotating magnetic field is greater than or equal to $\pi$ times the transverse spin relaxation time.

* * * * *